US011363922B2

(12) United States Patent
Burgess et al.

(10) Patent No.: US 11,363,922 B2
(45) Date of Patent: Jun. 21, 2022

(54) VACUUM CLEANER AND FILTER FOR A VACUUM CLEANER

(71) Applicant: TTI (Macao Commercial Offshore) Limited, Macau (MO)

(72) Inventors: Roderick Burgess, Charlotte, NC (US); Robert Patrick Warren, Charlotte, NC (US); Joseph M. Lehman, New Albany, OH (US); Garry Fee, Huntersville, NC (US); Michael Bloom, Charlotte, NC (US); William Jacob Kozlowski, Jr., Waxhaw, NC (US); Steven Marcus, Charlotte, NC (US)

(73) Assignee: Techtronic Floor Care Technology Limited, Tortola (VG)

( * ) Notice: Subject to any disclaimer, the term of this patent is extended or adjusted under 35 U.S.C. 154(b) by 257 days.

(21) Appl. No.: 16/679,866

(22) Filed: Nov. 11, 2019

(65) Prior Publication Data

US 2020/0085266 A1 Mar. 19, 2020

Related U.S. Application Data

(63) Continuation of application No. 15/488,027, filed on Apr. 14, 2017, now Pat. No. 10,470,625.

(Continued)

(51) Int. Cl.
*A47L 5/24* (2006.01)
*B01D 46/52* (2006.01)
(Continued)

(52) U.S. Cl.
CPC .................... *A47L 5/24* (2013.01); *A47L 9/12* (2013.01); *A47L 9/14* (2013.01); *A47L 9/1454* (2013.01);
(Continued)

(58) Field of Classification Search
CPC .......... A47L 11/4075; A47L 5/24; A47L 9/12; A47L 9/14; A47L 9/1454; A47L 9/1481;
(Continued)

(56) References Cited

U.S. PATENT DOCUMENTS 2,543,556 A * 2/1951 Senne ....................... A47L 9/14
55/367
2,564,467 A * 8/1951 Cranmer ............... A47L 9/1445
55/362

(Continued)

FOREIGN PATENT DOCUMENTS

AU 2011265411 7/2012
CH 408311 2/1966
(Continued)

OTHER PUBLICATIONS

Chinese Patent Office Action for Application No. 201780037440.6 dated Aug. 4, 2020 (14 pages including statement of relevance).

(Continued)

*Primary Examiner* — Marc Carlson
(74) *Attorney, Agent, or Firm* — Michael Best & Friedrich LLP

(57) ABSTRACT

A vacuum cleaner including a suction inlet, a conduit in fluid communication with the suction inlet, a filter having a valve releasably connected to a filter inlet, the filter configured to collect debris drawn through the suction inlet. The vacuum cleaner further comprising a release mechanism moveable from a first position to a second position. In the first position, the filter is in fluid communication with the conduit to collect debris with the valve being open, and in the second position, the filter is disconnected from the conduit with the valve being closed. Movement of the release mechanism between the first and second positions closes the valve.

24 Claims, 31 Drawing Sheets

Related U.S. Application Data

(60) Provisional application No. 62/457,329, filed on Feb. 10, 2017, provisional application No. 62/457,543, filed on Feb. 10, 2017, provisional application No. 62/361,718, filed on Jul. 13, 2016, provisional application No. 62/323,384, filed on Apr. 15, 2016.

(51) Int. Cl.

| | | |
|---|---|---|
| *B01D 46/42* | (2006.01) | |
| *B01D 46/00* | (2022.01) | |
| *A47L 9/32* | (2006.01) | |
| *A47L 9/28* | (2006.01) | |
| *A47L 9/14* | (2006.01) | |
| *A47L 9/12* | (2006.01) | |
| *B01D 46/02* | (2006.01) | |
| *A47L 11/40* | (2006.01) | |
| *A47L 9/16* | (2006.01) | |

(52) U.S. Cl.
CPC ........... *A47L 9/1481* (2013.01); *A47L 9/1683* (2013.01); *A47L 9/2842* (2013.01); *A47L 9/2857* (2013.01); *A47L 9/2884* (2013.01); *A47L 9/322* (2013.01); *A47L 11/4075* (2013.01); *B01D 46/0001* (2013.01); *B01D 46/0005* (2013.01); *B01D 46/0089* (2013.01); *B01D 46/02* (2013.01); *B01D 46/42* (2013.01); *B01D 46/4227* (2013.01); *B01D 46/4254* (2013.01); *B01D 46/4272* (2013.01); *B01D 46/521* (2013.01); *B01D 2275/203* (2013.01); *B01D 2279/55* (2013.01)

(58) Field of Classification Search
CPC .......... A47L 9/1683; A47L 9/19; A47L 9/281; A47L 9/2842; A47L 9/2857; A47L 9/2884; A47L 9/322; B01D 2275/203; B01D 2279/55; B01D 46/0001; B01D 46/0005; B01D 46/0089; B01D 46/02; B01D 46/42; B01D 46/4227; B01D 46/4254; B01D 46/4272; B01D 46/521
See application file for complete search history.

(56) References Cited

U.S. PATENT DOCUMENTS

| | | | |
|---|---|---|---|
| 2,615,531 A * | 10/1952 | Allen | A47L 9/1481 |
| | | | 96/398 |
| 2,649,926 A * | 8/1953 | Cranmer | A47L 5/362 |
| | | | 55/362 |
| 2,729,303 A | 1/1956 | McMahan | |
| 2,804,167 A * | 8/1957 | Seck | A47L 9/1445 |
| | | | 55/367 |
| 3,369,348 A * | 2/1968 | Davis | B01D 46/02 |
| | | | 55/374 |
| 3,447,689 A | 6/1969 | Solymar | |
| 3,559,381 A | 2/1971 | Fesco | |
| 3,618,981 A | 11/1971 | Leising et al. | |
| 3,789,589 A | 2/1974 | Delany et al. | |
| 3,907,530 A | 9/1975 | Fesco | |
| 3,973,936 A | 8/1976 | Howard et al. | |
| 4,073,632 A | 2/1978 | Reinauer et al. | |
| 4,276,069 A | 6/1981 | Miller | |
| 4,325,163 A | 4/1982 | Mattson et al. | |
| D277,516 S | 2/1985 | Hayden et al. | |
| D304,250 S | 10/1989 | Hassel et al. | |
| 6,029,309 A | 3/2000 | Imamura | |
| 6,058,560 A | 5/2000 | Gab et al. | |
| 6,237,648 B1 | 5/2001 | Busacca et al. | |
| 6,256,834 B1 * | 7/2001 | Meijer | A47L 9/1427 |
| | | | 15/352 |
| D449,138 S | 10/2001 | Dodson et al. | |
| 6,571,422 B1 | 6/2003 | Gordon et al. | |
| 6,871,679 B2 | 3/2005 | Last | |
| 7,143,467 B2 | 12/2006 | Seith | |
| D544,347 S | 6/2007 | Last | |
| 7,237,298 B2 | 7/2007 | Reindle et al. | |
| 7,254,865 B2 | 8/2007 | Bosses | |
| D551,078 S | 9/2007 | Last | |
| 7,310,854 B2 | 12/2007 | Nam et al. | |
| 7,325,272 B2 | 2/2008 | Bosses | |
| 7,332,005 B2 * | 2/2008 | Wegelin | A47L 9/1481 |
| | | | 15/314 |
| 7,424,766 B2 | 9/2008 | Reindle et al. | |
| 7,468,083 B2 | 12/2008 | Davis et al. | |
| 7,509,707 B2 | 3/2009 | Pullins | |
| 7,599,758 B2 | 10/2009 | Reindle et al. | |
| 7,673,368 B2 | 3/2010 | Cloud, III | |
| 7,770,253 B2 | 8/2010 | Ha et al. | |
| 7,785,396 B2 | 8/2010 | Hwang et al. | |
| 7,823,249 B2 | 11/2010 | Zahuranec et al. | |
| D635,728 S | 4/2011 | Fjellman | |
| 7,958,598 B2 | 6/2011 | Yun et al. | |
| 7,998,234 B2 | 8/2011 | Hwang et al. | |
| 8,012,250 B2 | 9/2011 | Hwang et al. | |
| 8,021,452 B2 | 9/2011 | Hwang et al. | |
| 8,043,397 B2 | 10/2011 | Hwang et al. | |
| 8,043,410 B2 | 10/2011 | Hwang et al. | |
| 8,060,979 B2 | 11/2011 | Hwang et al. | |
| 8,092,562 B2 | 1/2012 | Sauer et al. | |
| 8,099,825 B2 | 1/2012 | Zahuranec et al. | |
| 8,157,881 B1 | 4/2012 | Anoszko et al. | |
| 8,240,001 B2 | 8/2012 | Hwang et al. | |
| D668,824 S | 10/2012 | Miers | |
| 8,286,299 B2 | 10/2012 | Williams et al. | |
| 8,302,250 B2 | 11/2012 | Dyson et al. | |
| 8,312,593 B2 | 11/2012 | Hwang et al. | |
| 8,404,034 B2 | 3/2013 | Hwang et al. | |
| 8,424,154 B2 | 4/2013 | Beskow et al. | |
| D682,694 S | 5/2013 | van den Hoonaard | |
| 8,449,639 B2 | 5/2013 | Sauer et al. | |
| 8,460,256 B2 * | 6/2013 | Michaels | A47L 7/0038 |
| | | | 604/317 |
| D687,719 S | 8/2013 | Last | |
| 8,661,610 B2 | 3/2014 | Lui et al. | |
| D703,890 S | 4/2014 | Shin et al. | |
| 8,689,398 B2 | 4/2014 | Chung et al. | |
| D704,058 S | 5/2014 | Last | |
| D704,556 S | 5/2014 | van den Hoonaard | |
| 8,726,457 B2 | 5/2014 | Liu et al. | |
| 8,726,459 B2 | 5/2014 | Yun et al. | |
| 8,794,488 B2 | 8/2014 | van der Molen | |
| 8,806,705 B2 | 8/2014 | Minor et al. | |
| 8,893,912 B2 | 11/2014 | Van Der Molen et al. | |
| 8,916,002 B1 | 12/2014 | Landolt | |
| 8,939,302 B2 | 1/2015 | Last et al. | |
| 8,950,939 B2 | 2/2015 | Last et al. | |
| 9,015,897 B2 | 4/2015 | Jonsson et al. | |
| D731,136 S | 6/2015 | Yun et al. | |
| D731,720 S | 6/2015 | Gidwell et al. | |
| D731,724 S | 6/2015 | Cheon et al. | |
| 9,113,764 B2 | 8/2015 | Theising | |
| D738,584 S | 9/2015 | Niedzwecki | |
| 9,138,113 B2 | 9/2015 | Nesom et al. | |
| 9,145,237 B2 | 9/2015 | Van Der Molen | |
| D742,083 S | 10/2015 | Gidwell et al. | |
| 9,232,879 B2 * | 1/2016 | Schultink | A47L 9/1454 |
| D770,111 S | 10/2016 | Lee et al. | |
| D771,890 S | 11/2016 | Kim | |
| D772,512 S | 11/2016 | Yoon et al. | |
| D774,260 S | 12/2016 | Manning | |
| D775,772 S | 1/2017 | Lee et al. | |
| D792,665 S | 7/2017 | Salagnac | |
| D798,009 S | 9/2017 | Salagnac | |
| D799,767 S | 10/2017 | Palladino et al. | |
| D800,977 S | 10/2017 | Dammkoehler et al. | |
| D800,978 S | 10/2017 | Dammkoehler et al. | |
| D800,980 S | 10/2017 | Carter et al. | |
| D804,114 S | 11/2017 | Kim et al. | |
| 10,470,625 B2 * | 11/2019 | Burgess | A47L 9/2842 |
| 11,058,273 B2 * | 7/2021 | Marcus | A47L 9/30 |

(56) References Cited

U.S. PATENT DOCUMENTS

| | | | |
|---|---|---|---|
| 2004/0168280 A1* | 9/2004 | Wegelin | A47L 9/1481 15/347 |
| 2005/0091784 A1 | 5/2005 | Bone | |
| 2005/0183230 A1 | 8/2005 | Uehigashi | |
| 2005/0273968 A1 | 12/2005 | Seith | |
| 2006/0242787 A1 | 11/2006 | Bosses | |
| 2007/0214597 A1 | 9/2007 | Suzuki | |
| 2008/0016832 A1* | 1/2008 | Krisko | B01D 46/4227 55/342 |
| 2008/0134461 A1 | 6/2008 | Hedelund Nielsen | |
| 2009/0139048 A1* | 6/2009 | Williams | B23D 59/006 15/347 |
| 2009/0241285 A1 | 10/2009 | Hinklin et al. | |
| 2010/0180398 A1 | 7/2010 | Casper | |
| 2010/0230410 A1 | 9/2010 | Last et al. | |
| 2010/0293742 A1 | 11/2010 | Chung et al. | |
| 2011/0232687 A1 | 9/2011 | Stein | |
| 2012/0152280 A1 | 6/2012 | Bosses et al. | |
| 2012/0261441 A1 | 10/2012 | van den Hoonaard | |
| 2012/0267891 A1 | 10/2012 | Walz et al. | |
| 2013/0185892 A1 | 7/2013 | Walker | |
| 2013/0199662 A1 | 8/2013 | Gebbink et al. | |
| 2014/0020346 A1* | 1/2014 | Esswein | B01D 46/02 55/304 |
| 2014/0144865 A1 | 5/2014 | Last | |
| 2016/0051109 A1 | 2/2016 | Hwang et al. | |
| 2016/0174800 A1* | 6/2016 | Conrad | A47L 9/1691 15/353 |
| 2016/0214046 A1 | 7/2016 | Jursich et al. | |
| 2016/0296867 A1* | 10/2016 | Stark | B01D 46/52 |
| 2017/0000305 A1 | 1/2017 | Gordon et al. | |
| 2017/0136483 A1 | 5/2017 | Slama et al. | |
| 2017/0182445 A1 | 6/2017 | Zhang et al. | |
| 2017/0196419 A1 | 7/2017 | Brown et al. | |
| 2017/0258282 A1 | 9/2017 | Shinagawa | |
| 2018/0193783 A1 | 7/2018 | Baldinger | |
| 2018/0271344 A1 | 9/2018 | Han et al. | |
| 2018/0304187 A1 | 10/2018 | Schuld | |
| 2019/0275456 A1* | 9/2019 | Burgess | B01D 46/4272 |
| 2020/0085266 A1* | 3/2020 | Burgess | A47L 11/4075 |

FOREIGN PATENT DOCUMENTS

| | | |
|---|---|---|
| CN | 1090469 | 9/2002 |
| CN | 2527215 | 12/2002 |
| CN | 2528381 | 1/2003 |
| CN | 1463669 | 12/2003 |
| CN | 1524487 | 9/2004 |
| CN | 100382739 | 3/2005 |
| CN | 1765306 | 5/2006 |
| CN | 1951295 | 4/2007 |
| CN | 1954754 | 5/2007 |
| CN | 1954766 | 5/2007 |
| CN | 1973749 | 6/2007 |
| CN | 201015573 | 2/2008 |
| CN | 100374062 | 3/2008 |
| CN | 101229029 | 7/2008 |
| CN | 201153911 | 11/2008 |
| CN | 101313832 | 12/2008 |
| CN | 201167925 | 12/2008 |
| CN | 100450412 | 1/2009 |
| CN | 101387876 | 3/2009 |
| CN | 101558970 | 10/2009 |
| CN | 101558976 | 10/2009 |
| CN | 100571593 | 12/2009 |
| CN | 101596086 | 12/2009 |
| CN | 101612016 | 12/2009 |
| CN | 101756674 | 6/2010 |
| CN | 101822508 | 9/2010 |
| CN | 101945607 | 1/2011 |
| CN | 101953666 | 1/2011 |
| CN | 201734660 | 2/2011 |
| CN | 102068220 | 5/2011 |
| CN | 102256524 | 11/2011 |
| CN | 102599857 | 7/2012 |
| CN | 202288130 | 7/2012 |
| CN | 202526083 | 11/2012 |
| CN | 103037746 | 4/2013 |
| CN | 202932857 | 5/2013 |
| CN | 203138359 | 8/2013 |
| CN | 203302992 | 11/2013 |
| CN | 203314892 | 12/2013 |
| CN | 103874446 | 6/2014 |
| CN | 203861136 | 10/2014 |
| CN | 203861137 | 10/2014 |
| CN | 203885442 | 10/2014 |
| CN | 203914785 | 11/2014 |
| CN | 104224049 | 12/2014 |
| CN | 204192519 | 3/2015 |
| CN | 204274321 | 4/2015 |
| CN | 205092625 | 3/2016 |
| CN | 105496311 | 4/2016 |
| CN | 105496312 | 4/2016 |
| CN | 205162973 | 4/2016 |
| CN | 205162975 | 4/2016 |
| CN | 105534412 | 5/2016 |
| CN | 105581731 | 5/2016 |
| CN | 105595920 | 5/2016 |
| CN | 105640438 | 6/2016 |
| CN | 205458450 | 8/2016 |
| CN | 205514398 | 8/2016 |
| CN | 205514399 | 8/2016 |
| CN | 205514400 | 8/2016 |
| CN | 205514401 | 8/2016 |
| CN | 205649469 | 10/2016 |
| CN | 106175594 | 12/2016 |
| DE | 10055926 | 5/2002 |
| DE | 102007036157 | 2/2009 |
| DE | 202008002310 | 6/2009 |
| DE | 102008010068 | 8/2009 |
| DE | 102008038893 | 2/2010 |
| DE | 102009035717 | 2/2011 |
| DE | 102011006542 | 10/2012 |
| DE | 102011052023 | 1/2013 |
| DE | 202011052208 | 3/2013 |
| DE | 202013100862 | 3/2013 |
| DE | 202013103508 | 8/2013 |
| DE | 102014002743 | 9/2014 |
| DE | 102014109596 | 2/2015 |
| DE | 202015101218 | 4/2015 |
| DE | 202014100563 | 5/2015 |
| DE | 102014209925 | 11/2015 |
| DE | 102015108462 | 12/2016 |
| EP | 18369412 | 9/2007 |
| EP | 1894507 | 3/2008 |
| EP | 1480545 | 4/2008 |
| EP | 1318746 | 9/2009 |
| EP | 2380477 | 10/2011 |
| EP | 2249688 | 5/2013 |
| EP | 2378940 | 5/2013 |
| EP | 1933685 | 3/2014 |
| EP | 2732747 | 5/2014 |
| EP | 2772173 | 9/2014 |
| EP | 2820991 | 1/2015 |
| GB | 879781 | 10/1961 |
| GB | 2407257 | 4/2005 |
| GB | 2441962 | 3/2008 |
| WO | 2007033977 | 3/2007 |
| WO | 2009011482 | 1/2009 |
| WO | 2016096045 | 1/2016 |
| WO | 2016206732 | 12/2016 |

OTHER PUBLICATIONS

International Search Report Report and Written Opinion for Application No. PCT/US2017/027684 dated Aug. 22, 2017 (19 pages).
Dirt Devil Hand Vac Owner's Manual for Model No. 1-500181-001, 1995, (8 pages).
International Invitation To Pay Additional Fees and Partial International Search for Application No. PCT/US2017/027671 dated Oct. 2, 2017 (15 pages).

(56) References Cited

OTHER PUBLICATIONS

International Search Report and Written Opinion for Application No. PCT/US2014/027671 dated Nov. 30, 2017. 22 pages.

* cited by examiner

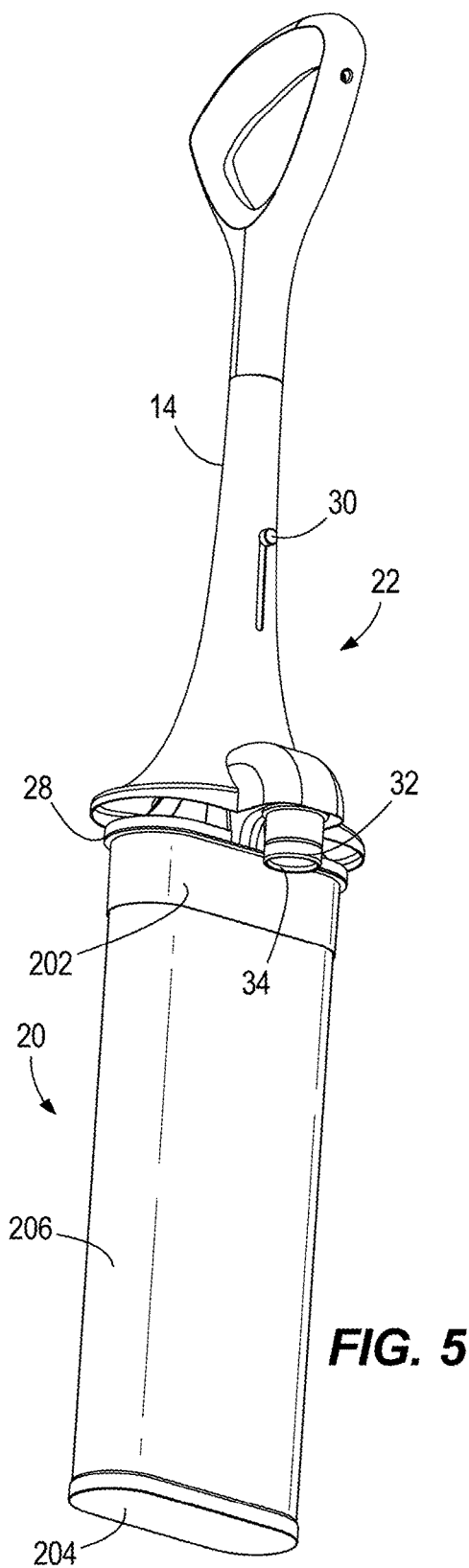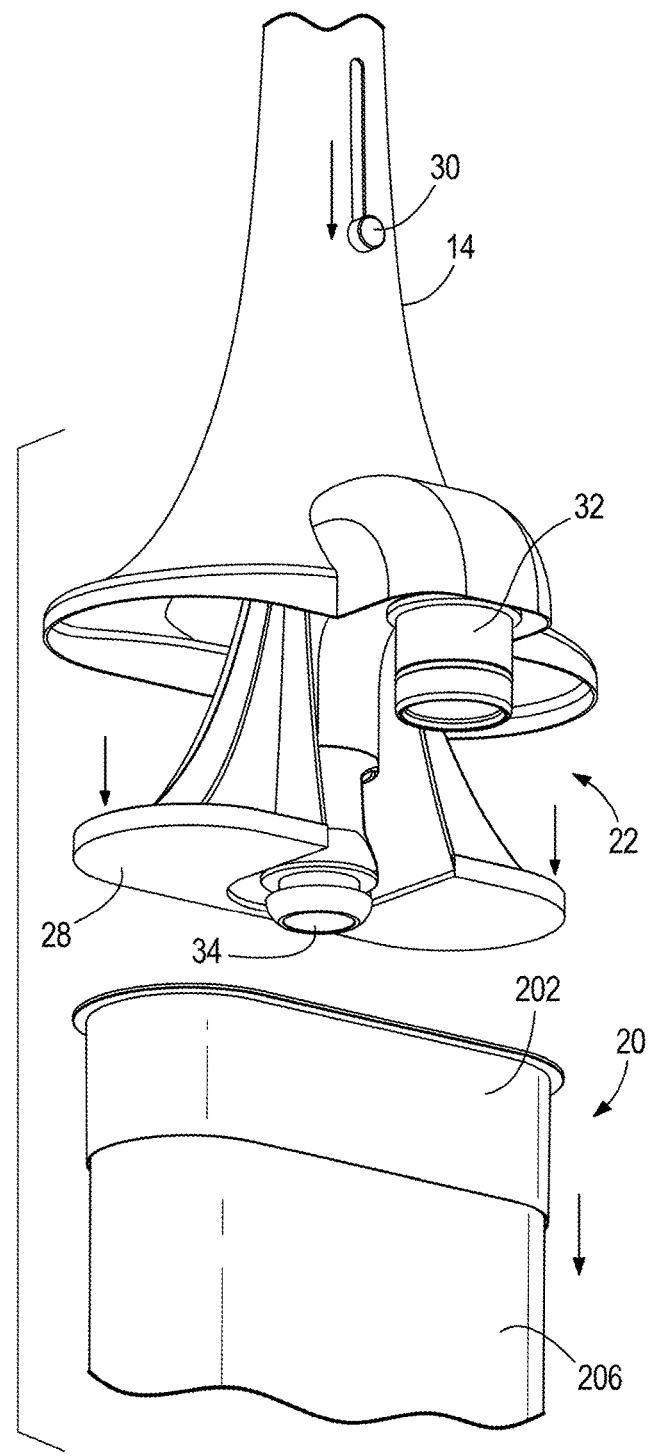
FIG. 5
FIG. 6

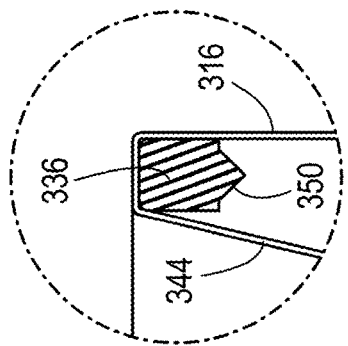
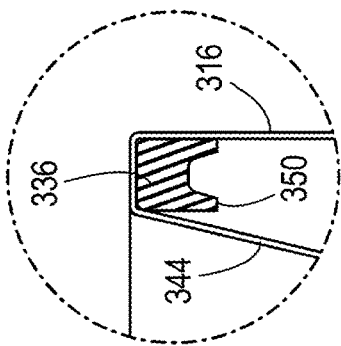
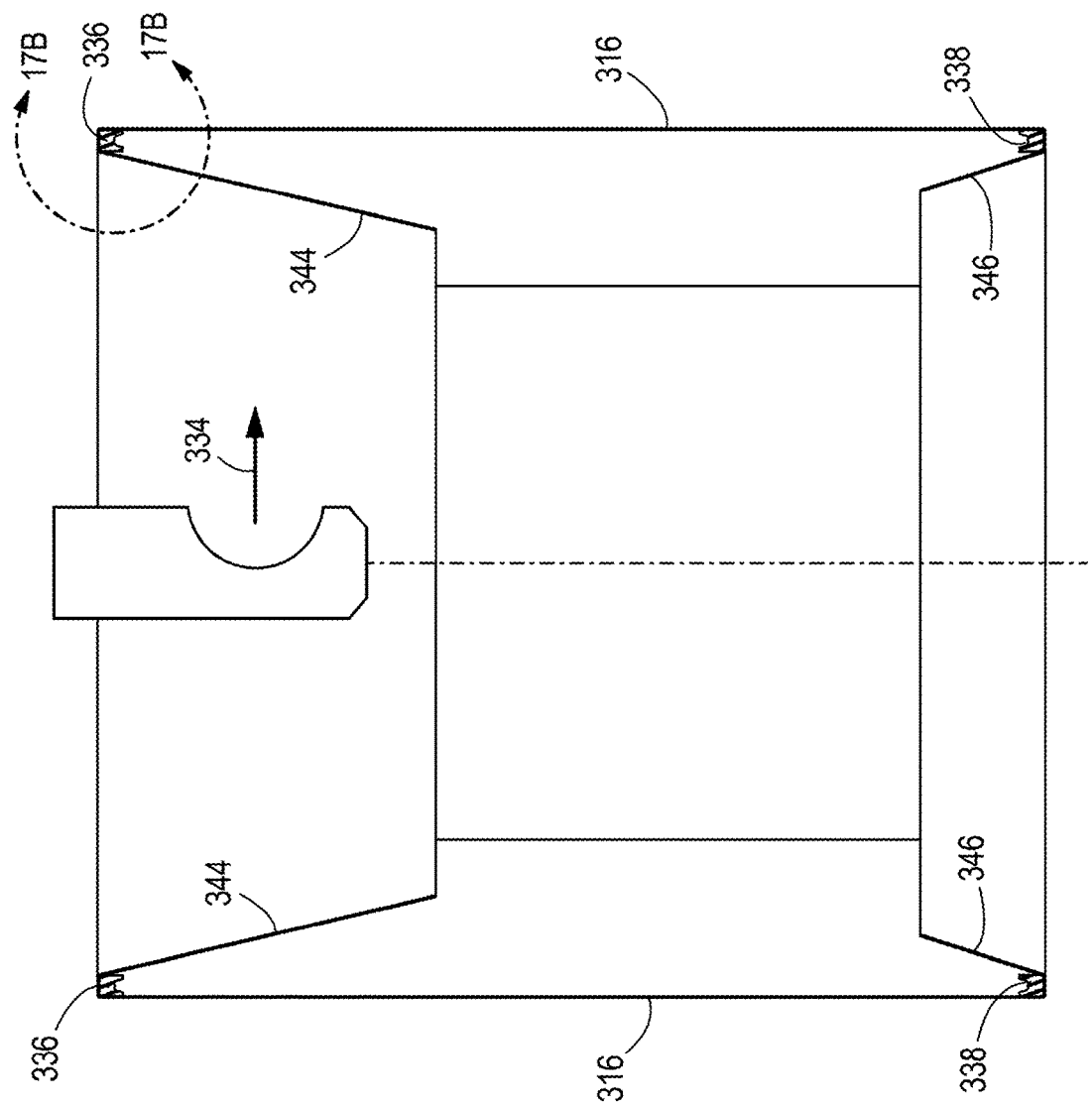

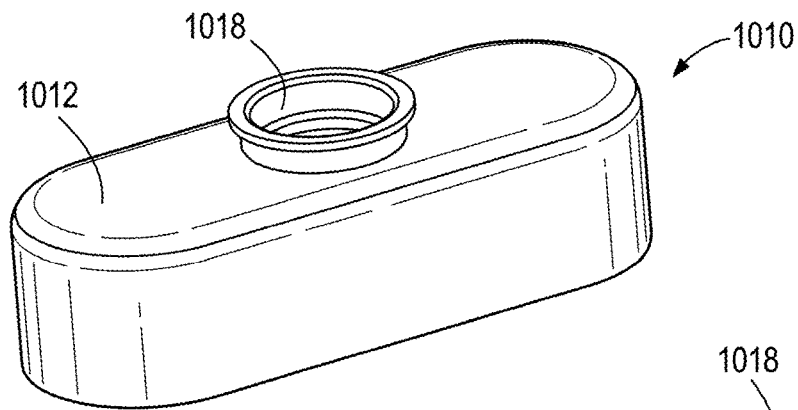
*FIG. 25A*
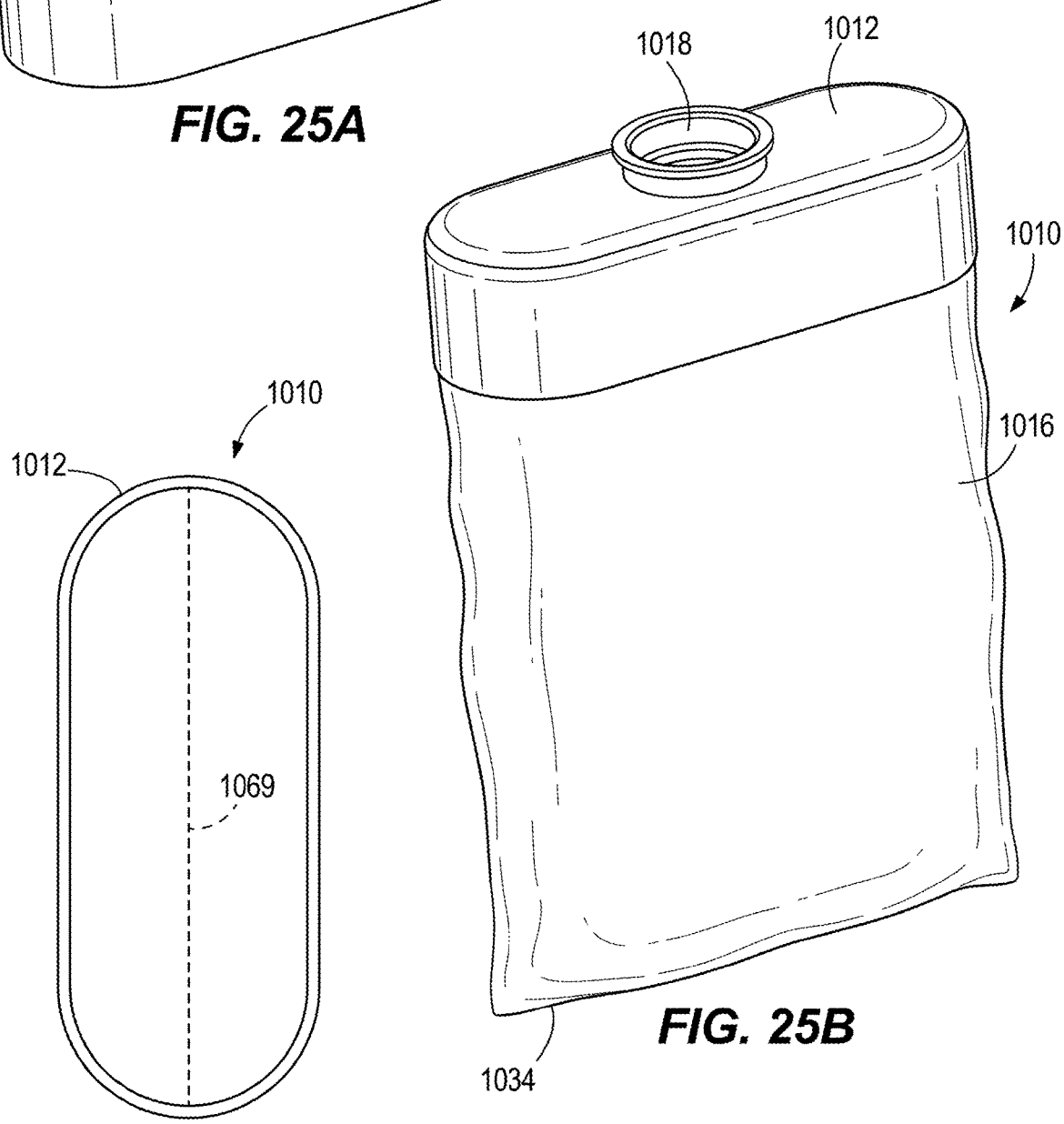
*FIG. 25C*
*FIG. 25B*

VACUUM CLEANER AND FILTER FOR A VACUUM CLEANER

CROSS-REFERENCE TO RELATED APPLICATIONS

This application is a continuation of U.S. patent application Ser. No. 15/488,027, filed Apr. 14, 2017, which issued as U.S. Pat. No. 10,470,625 on Nov. 12, 2019, which claims priority to the following: U.S. Provisional Patent Application No. 61/323,384, filed Apr. 15, 2016, U.S. Provisional Patent Application No. 62/361,718, filed Jul. 13, 2016, U.S. Provisional Patent Application No. 62/457,329, filed Feb. 10, 2017, U.S. Provisional Patent Application No. 62/457,543, filed Feb. 10, 2017, the entire contents all of which are hereby incorporated by reference herein.

FIELD OF THE INVENTION

The present invention relates to vacuum cleaners and a filters for vacuum cleaners.

BACKGROUND

Some types of vacuum cleaners include a filter bag for collecting and storing debris while filtering the air drawn through the vacuum with the debris. Once the bag is full, the bag is disconnected from the vacuum and replaced with a new filter. In prior vacuum cleaners, it is typically necessary for a user to touch or grasp the bag in order to disconnect the hag from the vacuum and dispose of the bag, which some consumers do not prefer because of the dirt and debris inside the bag.

SUMMARY

In one embodiment, what is disclosed is a vacuum cleaner including a suction inlet, a conduit in fluid communication with the suction inlet, a filter having a valve releasably connected to a filter inlet, the filter configured to collect debris drawn through the suction inlet. The vacuum cleaner further comprising a release mechanism moveable from a first position to a second position. In the first position, the filter is in fluid communication with the conduit to collect debris with the valve being open, and in the second position, the filter is disconnected from the conduit with the valve being closed. Movement of the release mechanism between the first and second positions closes the valve.

In another embodiment, what is disclosed is a filter for use with a vacuum cleaner. The filter includes an upper housing configured to be supported by the vacuum cleaner, a lower housing coupled to the upper housing, and a filter media coupled to the upper housing. The filter media and the upper housing at least partially define a chamber configured to collect debris. A valve is coupled to the upper housing and movable between an open position where debris is permitted to enter the chamber and a closed position where debris is inhibited from entering and exiting the chamber.

In another embodiment, what is disclosed is a filter for use with a vacuum cleaner. The filter includes an upper housing configured to be supported by the vacuum cleaner and a filter media coupled to the upper housing. The filter media and the upper housing at least partially define a chamber configured to collect debris. The filter media is moveable between a collapsed position and an expanded position. At least a portion of the filter media is encased by the upper housing when the filter media is in the collapsed position. The filter media extends away from the upper housing when the filter media is in the expanded position.

In another embodiment, what is disclosed is a filter for use with a vacuum cleaner. The filter includes an upper housing configured to be supported by the vacuum cleaner and a filter media coupled to the upper housing. The filter media and the upper housing at least partially define a chamber configured to collect debris. The filter media is moveable between a collapsed position and an expanded position. At least a portion of the filter media is encased by the upper housing when the filter media is in the collapsed position.

Other aspects of the will become apparent by consideration of the detailed description and accompanying drawings.

BRIEF DESCRIPTION OF THE DRAWINGS

FIG. 5 illustrates a handle and the filter removed from the vacuum cleaner for disposal of the filter.

FIG. 6 illustrates the filter being released from the handle.

FIG. 17A is a cross-sectional view of the filter, illustrating the filter media of the filter without the upper and lower housing.

FIG. 17B is an enlarged view of the filter of FIG. 17A, illustrating an embodiment of an attachment member.

FIG. 17C is an enlarged view of the filter of FIG. 17A, illustrating another embodiment of an attachment member.

FIG. 25A is a perspective view of a filter in a collapsed position according to an embodiment.

FIG. 25B is a perspective view of the filter of FIG. 25A in an expanded position.

FIG. 25C is a bottom side view of the fitter of FIG. 25A in the collapsed position.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
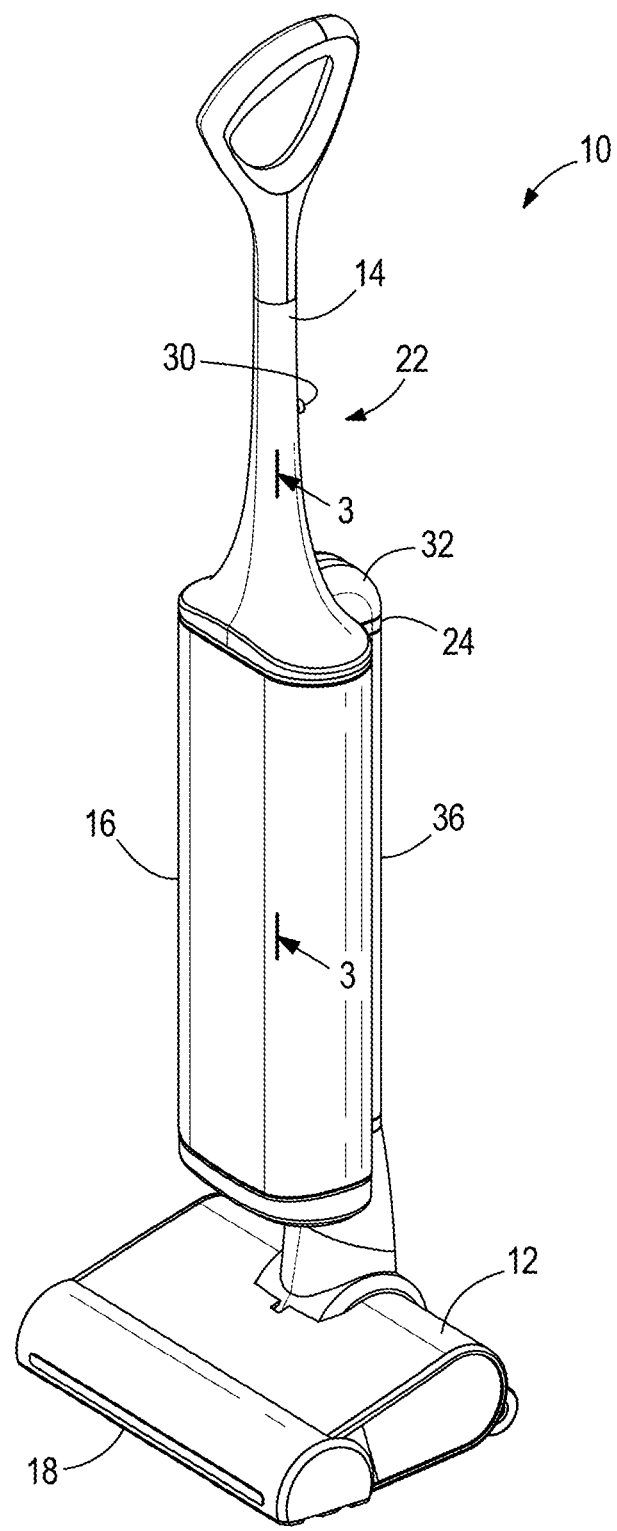
FIG. 1 is a perspective view of a vacuum cleaner according to an embodiment.
Figure 4:
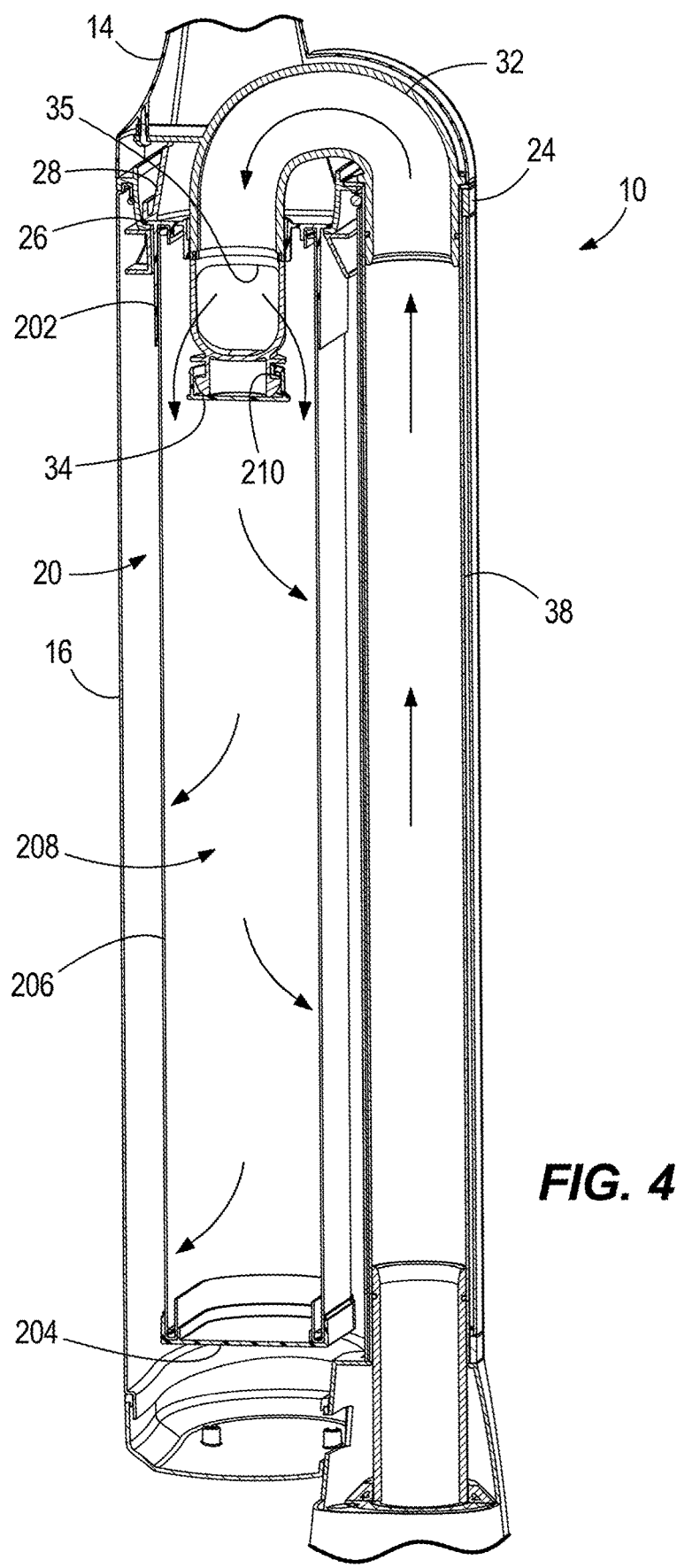
FIG. 4 is a partial cross-sectional view of the vacuum cleaner of FIG. 1 illustrating the filter in an expanded position.

FIG. 1 illustrates a vacuum cleaner 10 having a base 12, a handle 14 to maneuver the base 12 over a surface, and a body 16 between the base 12 and the handle 14. The base 12 supports the vacuum cleaner 10 on the surface and the base 12 includes a suction inlet 18 for drawing debris from the surface. The debris is directed toward and collected in a filter 20 (FIG. 4). The handle 14 is grasped by an operator to facilitate in propelling and maneuvering the vacuum 10. As will be discussed in more detail below, when an operator is done cleaning and the filter 20 is full of debris, the filter 20 can be disposed of without touching or handling the filter 20 and a new filter is easily loaded into the vacuum 10. Although the vacuum cleaner 10 of the illustrated embodiment is shown as an upright vacuum, in other embodiments, the vacuum cleaner 10 may be other types of vacuums (e.g., canister vacuum, hand-held vacuum, backpack vacuum, robotic vacuum, etc.).

Figure 2:
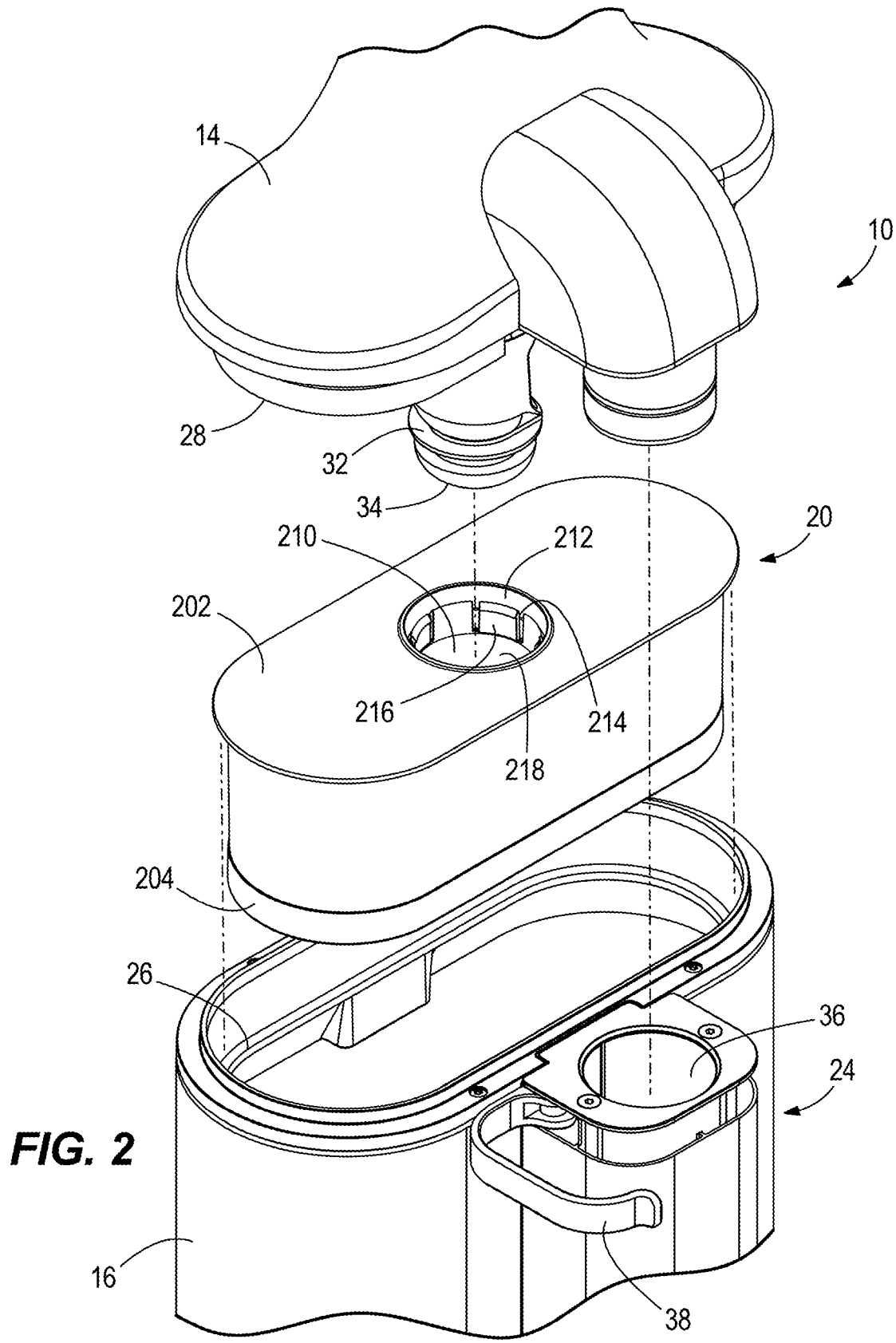
FIG. 2 is a partially exploded view of the vacuum cleaner of FIG. 1.
Figure 3:
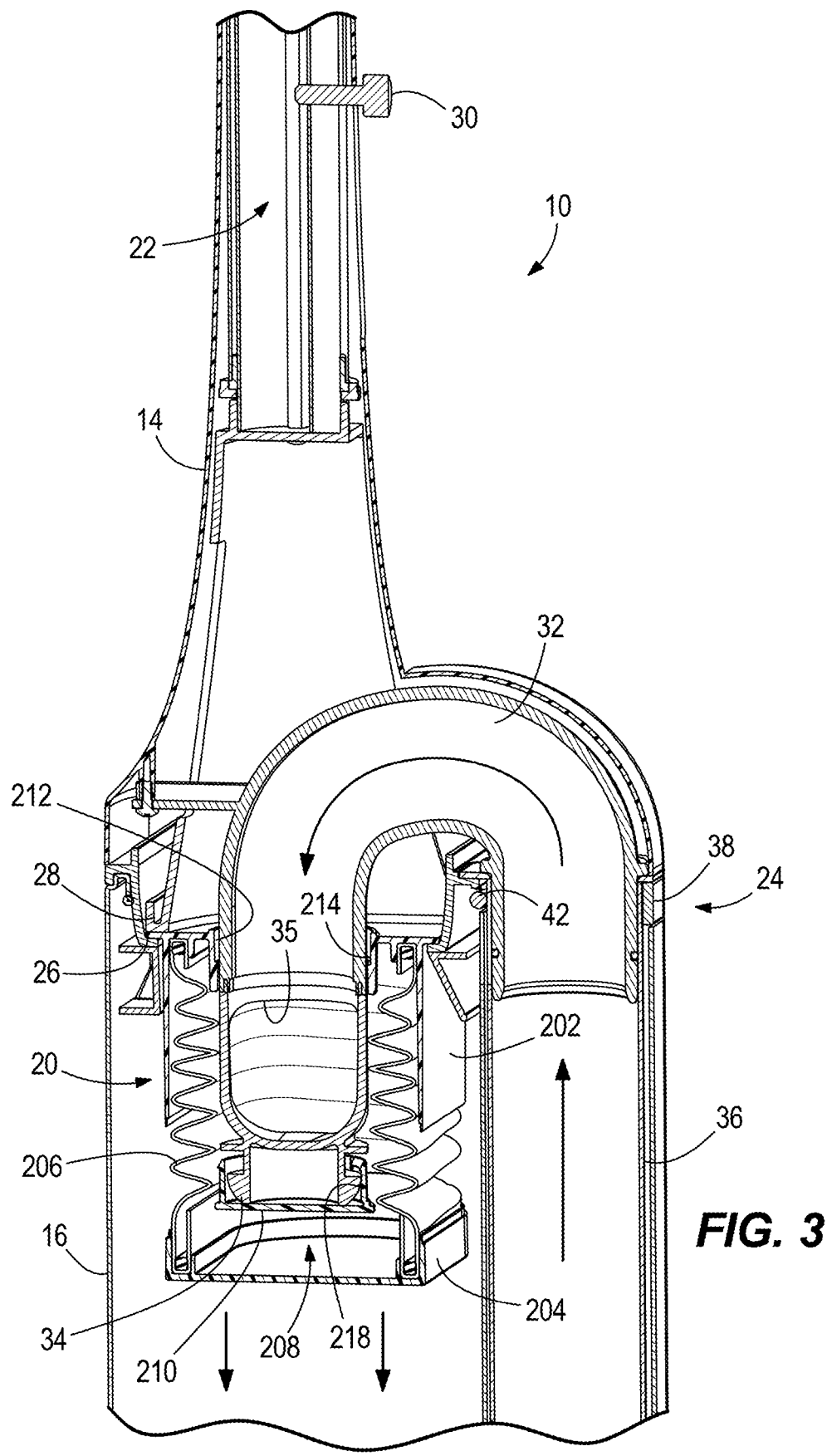
FIG. 3 is a partial cross-sectional view of the vacuum cleaner of FIG. 1 taken along lines 3-3 of FIG. 1 illustrating the filter in a partially collapsed position.

With reference to FIGS. 2-4, the filter 20 of the illustrated embodiment is installed through the top of the body 16. The filter 20 may be provided in a collapsed position (position shown in FIG. 2) in the form of a pod or cartridge. In the illustrated embodiment, the filter 20, which will be discussed in more detail below, includes an upper housing 202 and a lower housing 204, and a filter media 206 interconnecting the upper housing 202 and the lower housing 204. The housings 204, 206 and the filter media 206 define a chamber 208 (FIG. 4) in which the debris is collected. In one embodiment the filter media 206 includes a nonwoven, HEPA filter material.

With continued reference to FIGS. 2-4, the filter 20 includes a valve 210 releasably connected to an inlet 212. The upper housing 202 includes the inlet 212 that allows debris to enter the chamber 208. The filter 20 is expandable from the collapsed position (FIG. 2) to an expanded position (FIG. 4). FIG. 3 illustrates the filter 20 in a partially expended position. In the illustrated collapsed position, the lower housing 204 engages the upper housing 202, and the filter media 206 is encased by the upper and lower housings 202, 204. This provides a convenient way for the filter 20 to be stored, shipped, etc. before being used. In the embodiment shown in FIGS. 2-4, the lower housing includes a rigid or semi-rigid material, such as a thermoplastic, thermoset (molded or cast), formed paper pulp, formed non-woven, or any other shaped, rigid or semi-rigid, non-porous or filtering material. In some embodiments, the upper housing 202 and/or the lower housing 204 includes a fastener (such as a clip, tab, friction fit, tape, shrink-wrap, film, hook-and-loop fastener, etc.) that releasably connects the housings 202, 204 in the collapsed position. In the expanded position, the lower housing 204 is released from the upper housing 202 and the filter media 206 is fully expanded. In other embodiments, the housings 202, 204 can be other types of capsules that are capable of encasing the filter media 206. In the illustrated embodiment, the inlet 212 is located in the upper housing 202. In other embodiments, the vacuum 10 can be configured such that the inlet 212 is located in the lower housing 204 such that debris enters through the bottom of the filter 29. Other example embodiments of the filter 20 are discussed below.

With continued reference to FIGS. 2-4, valve 210 moves between a closed position (FIG. 2) for sealing the inlet 212 and an open position (FIGS. 3 and 4) where debris is allowed to enter the filter chamber 208. Sealing the inlet 212 with the valve 210 inhibits discharge of debris when the filter 20 is changed. A seal may be provided between the valve 210 and upper housing 202 at the inlet 212. The seal may be an o-ring. Alternatively, the seal may be a resilient material such as a gasket or molded sealing surface. The valve could be mounted to either the upper housing 202 or the inlet 212. As shown in FIGS. 2 and 3, the inlet 212 includes a shoulder 214 and the valve 210 includes a plurality of flexible fingers 216. When engaged, features on the flexible fingers 216 engage the shoulder 214 to retain the valve 210 within the inlet 212 to maintain the valve 210 in the closed position. In moving to the open position, the flexible fingers 216 of the valve 210 release from the shoulder 214 by flexing and slipping past the shoulder, thereby opening the inlet 212 to provide fluid communication between the inlet 212 and the interior of the filter 20 (i.e., the chamber 208). As shown in the closed position, shoulder 214 and the flexible fingers 216 provide a clearance fit between the inlet 212 and the valve 210 while the valve body closes the inlet. In various alternatives, the valve may seal the inlet in an airtight closure. In other alternatives, the seal of the valve closure may not be airtight but inhibiting dust release as desired for an application. In the illustrated embodiment, the valve 210 connects to the conduit 32 when the valve is unseated to hold the valve 210 on the conduit 32 while the valve is open. The valve 210 may include a pocket 218. When the conduit 32 contacts the valve 210 with a sufficient force, corresponding features on the free end 34 of the conduit 32 enter and couple to the pocket 218 (via the flexible fingers 216) connecting the valve to the conduit. The connection of the valve to the conduit is such that the valve remains on the conduit until a predetermined valve-removal force is applied to the valve. The valve 210 may be retained on the conduit 32 using any interlocking or connecting features. In alternative embodiments, the valve is not connected to the conduit, but is held to the upper housing by a spring, hinge, tether, or other connection that allows the conduit to open the inlet opening. In yet another alternative, the inlet opening is not provided with a valve or is provided by a user-actuated closure such as a cover. In other embodiments, the releasable connection between the valve 210 and the inlet 212 may be a variety of other connections (e.g., snaps, tape, clips, friction fit, etc.).

With reference to FIGS. 3-4, the valve 210 is disconnected and spaced from the inlet 212 in the open position. In some embodiments, at least one tether, tab, strip of material or the like may be provided to connect the valve 210 to the upper housing 202. The material of the tether is flexible to permit movement of the valve 210 relative to the upper housing 202 between the open and closed positions. Although the valve 210 of the illustrated embodiment is a removable-type plug or cap, in other embodiments, the valve 210 can be other types of valves.

Figure 7A:
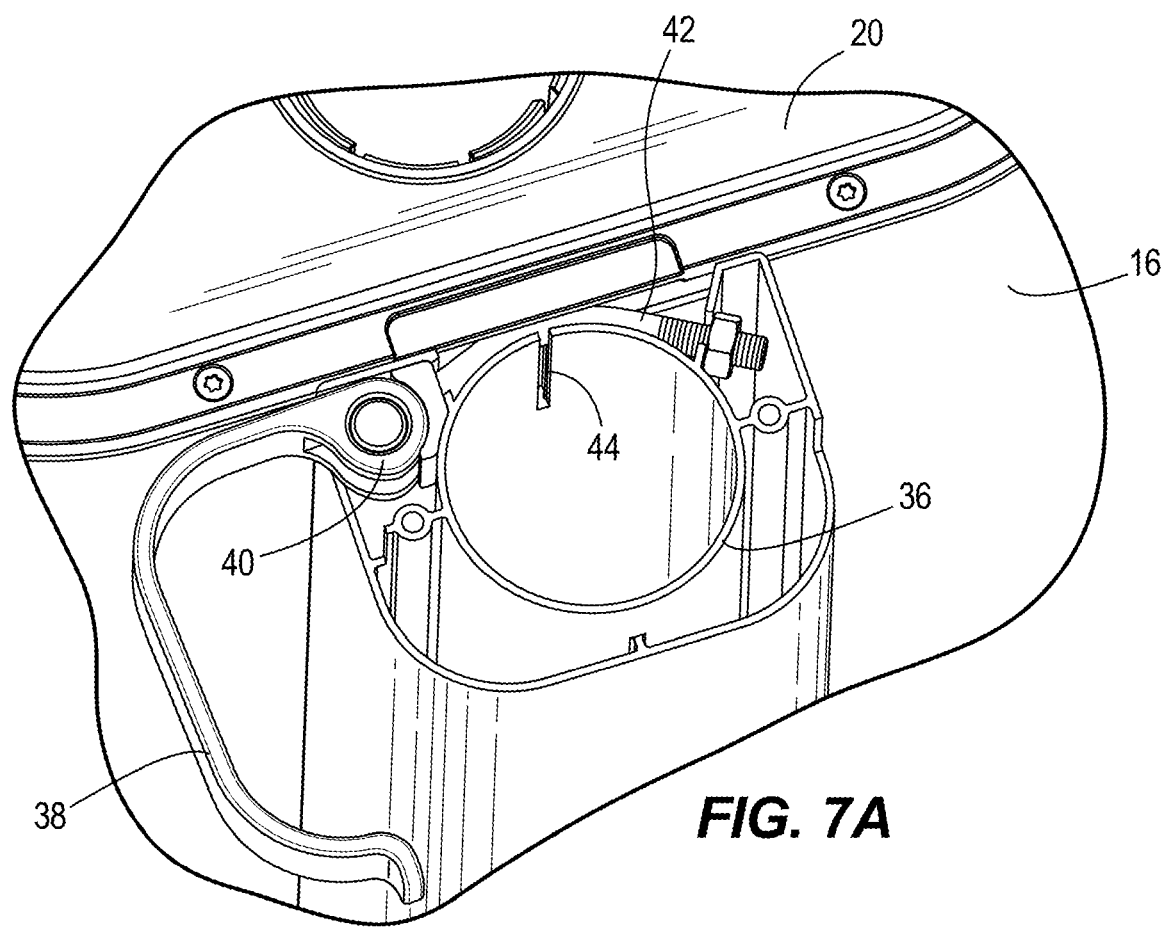
FIG. 7A illustrates a clamp of the vacuum in a released position.
Figure 7B:
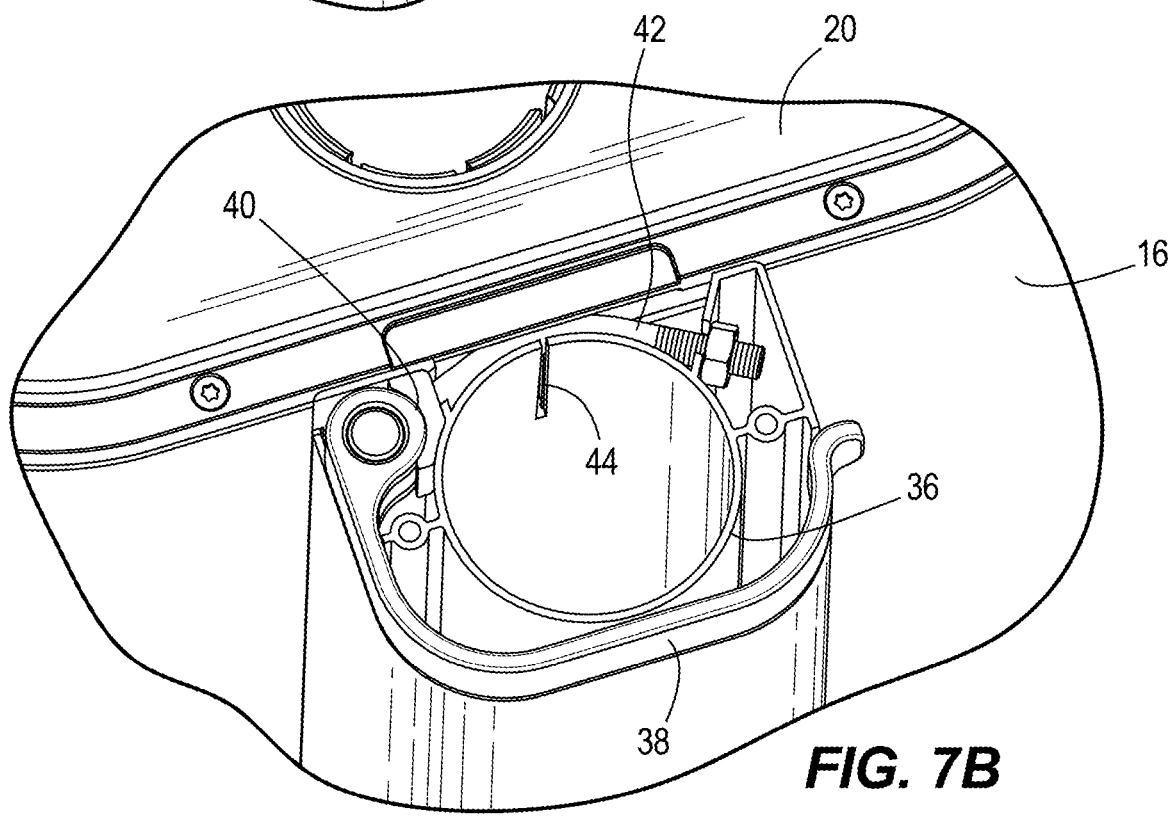
FIG. 7B illustrates the clamp in a clamped position.

With reference to FIGS. 5 and 6, the illustrated handle 14 includes a release mechanism 22 that allow an operator to dispose of the filter 20 without touching the filter 20. In the illustrated embodiment, the filter 20 is removable or disconnected from the handle 30 via the release mechanism 22 and the handle 14 is releasably connected to the body 16 via a latch 24 (FIGS. 2, 7A, and 7B).

Referring to FIG. 2, the upper housing 202 of the filter 20 is supported by a shoulder 26 of the body 16 or other retaining feature configured to receive and locate the filter 20 in an installed orientation within the body. The shoulder 26 is sized so that the lower housing 204 and the filter media 206 of the filter 20 is permitted to move relative to and below the shoulder 26. The shoulder 26 does not interfere with the lower housing 204 or the filter media 206 when the filter 20 moves between the collapsed and the expanded positions. In the illustrated embodiment, the filter 20 in the installed orientation within the body 16 is aligned with the conduit 32 such that moving the handle 14 to engagement by the latch 24 during coupling causes the conduit 32 to be aligned with the filter inlet 212.

With reference to FIGS. 2-3, the handle 14 further includes a conduit 32. The conduit 32 has a free end 34 and an aperture 35. The free end 34 is received by a pocket 218 of the valve 210. When the free end 34 contacts the valve 210 with a sufficient force, the free end 34 enters and couples to the pocket 218 (via the flexible lingers 216) of the valve 210. At this point, the valve 210 is coupled to and movable with the conduit.

With reference to FIGS. 5 and 6, the handle 14 includes the release mechanism 22 to allow an operator to dispose of the filter 20 without touching the filter 20. The filter 20 is removable or disconnected from the handle 14 via the release mechanism 22. The illustrated release mechanism 22 includes a pusher 28 and an actuator 30 slideably coupled to the handle 14 of the vacuum cleaner 10. The actuator 30 is moveable by the user from a first position or vacuum cleaner in use position (FIG. 5) to a second position or filter release position (FIG. 6). Movement of the actuator from the first position to the second position, moves the pusher 28 from a first or upper position (FIG. 5) to a second or lower position (FIG. 6). In the illustrated embodiment the pusher contacts the filter in between the first position and the second position. In the illustrated embodiment, the actuator 30 and pusher 28 are spring biased to the upper position illustrated in FIG. 5, which is generally the position of the pusher 28 when the vacuum cleaner is in use for vacuuming. When the user desires to replace the filter 20, the user moves the actuator 30 to the second position to release the filter 20 from conduit 32.

Referring to FIGS. 2, 3, 7A, and 7B, the body 16 of the vacuum 10 includes a debris conduit 36. The debris conduit 36 is in fluid communication with the suction inlet 18 of the vacuum 10 (FIG. 1). Debris and air travel from the suction inlet 18 through the debris conduit 36 and then into the conduit 32 of the handle before passing through the end 34 of conduit 32 and into the chamber 208 of the filter 20. The latch 24 allows the user to attach and detach the handle 14 from the body 16. The latch 24 includes a handle 38, a cam 40, and a tensioner 42. To release the latch 24, the user rotates the handle 38 to rotate the cam member 40, which releases the tension on the tensioner 42. The conduit 32 of the handle 14 can be inserted into (or removed from) the conduit 36 of the body 16 when the latch 24 is in the released position (FIG. 7A). To latch or secure the handle 14 to the body 16, the conduit 32 of the handle 14 is inserted into the conduit 36 of the body 16 and the latch 24 is moved to a latched position. To latch the latch 24, the handle 38 is rotated to rotate the cam 40 back to the latched position in FIG. 7B, which tensions the tensioner 40. Tension in the tensioner 40 reduces the circumference of the conduit 36 due to the small slit 44 in the conduit 36 to clamp the handle conduit 32 inside the body conduit 36.

In operation, a new filter 20 is installed in the vacuum cleaner 10 before collecting debris. The filter 20 is disposed of when the filter 20 is full of debris without an operator directly touching or contacting the filter 20. To install a new filter 20, an operator grasps the handle 14 and unlocks or releases the latch 24 and disconnects the handle 14 from body 16. Once the handle 14 is removed, the new filter 20 is positioned in the body 16. The filter is positioned in the body 16 so that the upper housing 202 of filter 20 is supported by the shoulder 26. The handle 14 is reattached to the body 16. The handle 14 is reattached by inserting the free end 34 of the conduit 32 into the valve 210 and inserting the other end of the conduit 32 into the conduit 36 of the body 16. The vacuum is configured such that the free end 34 of the conduit 32 automatically aligns with the valve 210 of the filter 20 and the conduit 32 automatically aligns with the conduit 36 of the body 16. This action opens the valve 210 (see FIG. 3) and can slightly expand the filter 20 as illustrated in FIG. 3 and the aperture 35 of the conduit 32 is located inside the filter 20. The handle 14 is secured by closing or latching the latch 24. In other embodiments, the actuator 30 can be used to move the conduit 32 of the handle 14 into engagement with the filter inlet after the handle 14 is attached to the body 16 in order to open the valve 210. Also, in the illustrated embodiment, the conduit 32 is inside the filter 20 when the handle 14 is attached. In other embodiments, the conduit 32 may seal on the upper housing 202 around the inlet such that air and debris can enter the filter but with the conduit substantially not inside the filter 20. In yet other embodiments, the upper housing 202 may include a protruding conduit that attaches to or engages the conduit 32 such that the conduit 32 does not enter the filter 20. Also, although the illustrated conduit 32 includes a single aperture 35, in other embodiments, the conduit may include more than one aperture 35.

The air and debris drawn in from the suction inlet 18 by the vacuum cleaner suction source passes through the conduits 32, 36 and into the filter 20, as shown in FIG. 3. The force of the air stream entering the filter 20 causes the filter 20 to expand from the collapsed position to the expanded position (FIG. 4).

When the filter 20 is full of debris, the user disconnects the handle 14 from the body 14 by releasing the latch 24. The handle 14 can then be used to carry the filter 20 (without touching the filter 20) to a garbage receptacle. The operator disposes of the filter 20 by pushing the actuator 3 from the first position (FIG. 5) to the second position (FIG. 6) causing the pusher 28 to push on the upper housing 202 of the filter 20 applying a user-applied force greater than the valve-removal force. In some embodiments, as a result of the pusher moving from the first position to the second position, the upper housing 202 moves along the conduit 32 of the handle 14 and the valve 21 is moved from the open or unseated position toward the closed. Eventually, the pusher 28 pushes the filter 20 into closed engagement with the valve and then off of the conduit 32 and the filter 20 drops from the handle 14 under gravity and into the garbage receptacle without the user having to touch the filter 20. Also, the valve 210 is closed so that debris does not exit the inlet 212 of the filter 20. The spring bias of the release mechanism automatically returns the pusher 28 and the actuator 30 back to the position of FIG. 5. In some embodiments, gravity causes the filter housing to slide along the conduit until the upper housing is retained or held from further movement by the valve attached to the conduit end. Then, moving the pusher toward the second position pushes the filter 20 into closed engagement with the valve and then off of the conduit 32. In other embodiments, the actuator 30 moves the conduit 32 into and out of engagement with the filter inlet while the pusher 28 remains stationery to remove the filter 20. In the illustrated embodiment, the valve-removal force may be selected to be greater than the weight of a filter filled with debris such that the weight of the filter does not pull the filter off of the conduit.

Figure 8:
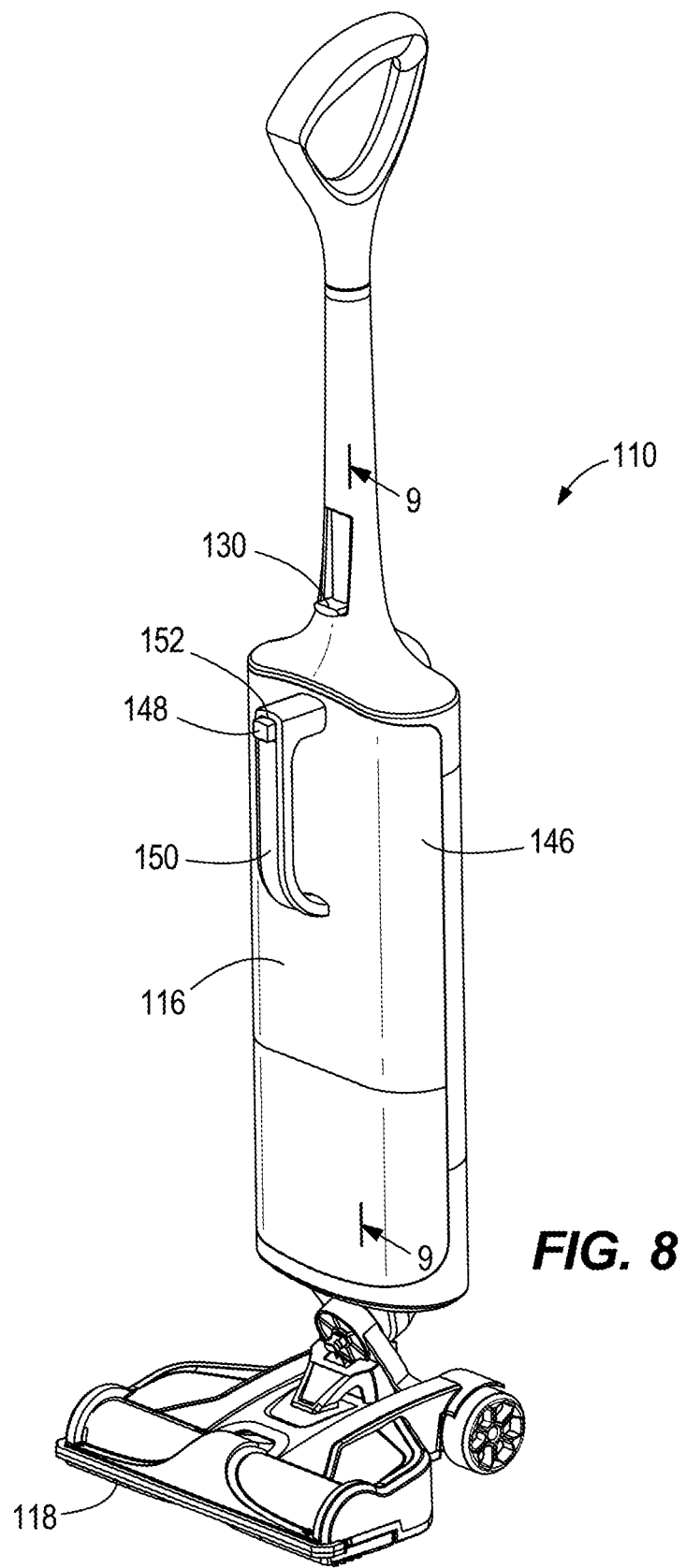
FIG. 8 is a perspective view of the vacuum cleaner according to another embodiment.
Figure 9:
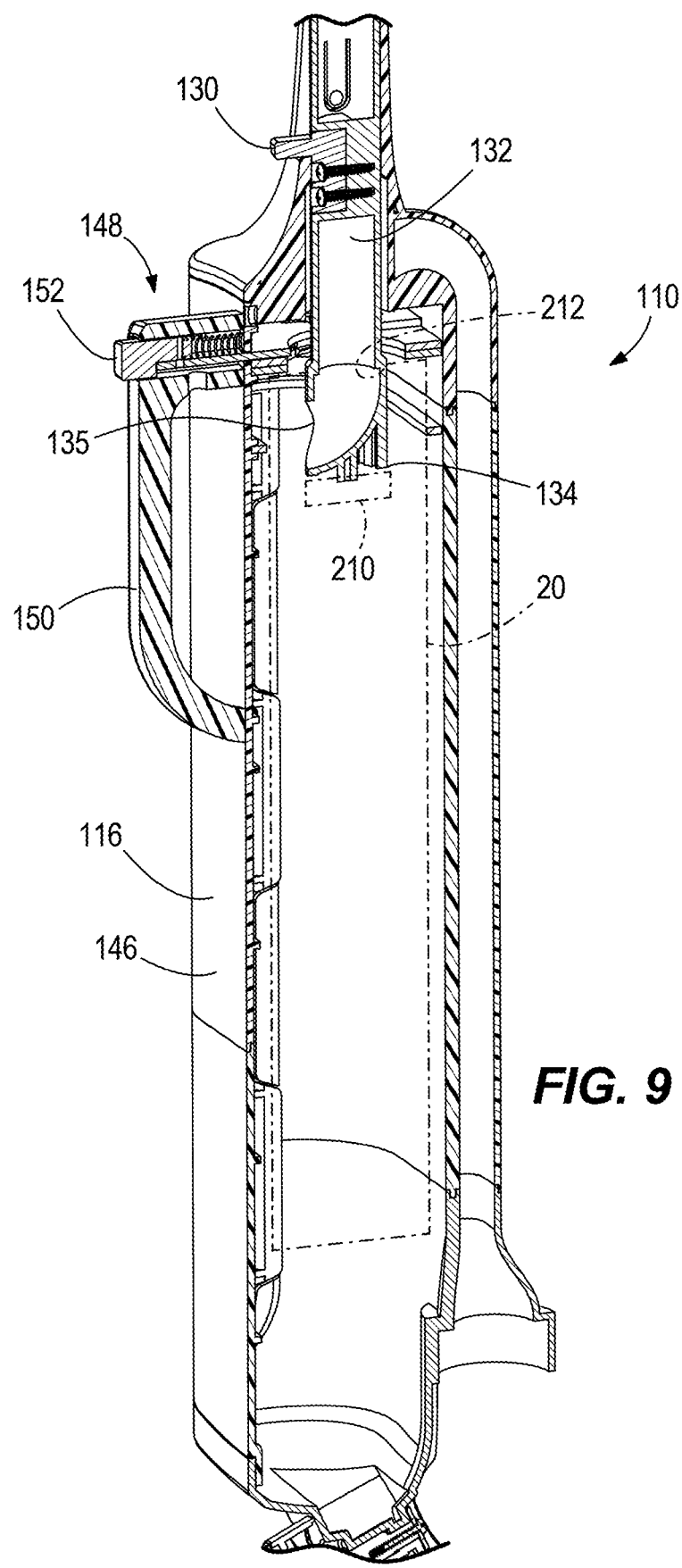
FIG. 9 is a partial cross-sectional view of the vacuum cleaner of FIG. 8.
Figure 10:
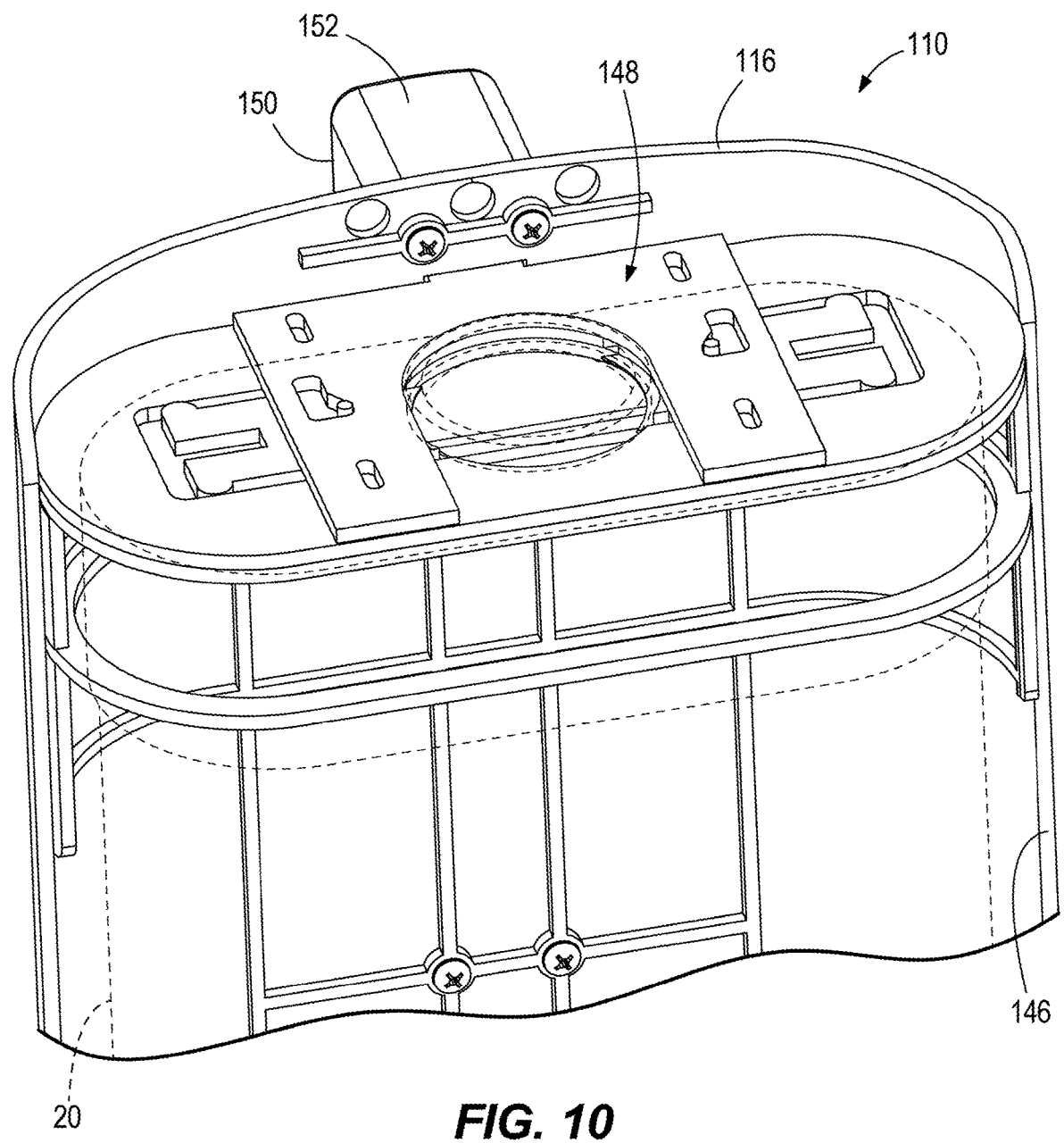
FIG. 10 is a view of a portion of the vacuum cleaner of FIG. 10.

FIGS. 8-10 illustrate a vacuum cleaner 110 in accordance with another embodiment. The vacuum cleaner 110 includes the filter 20 that is installed through the front of the body 216, but is otherwise similar to the vacuum cleaner 10 described above with reference to FIGS. 1-7B, with like components being shown with like reference numerals plus 100. Only some differences between the vacuum 10 and vacuum 110 are described below.

The filter 20 is supported by a panel 146 that is releasably coupled to the body 116. The panel 146 includes a release mechanism 148 to allow an operator to dispose of the filter 20 without touching or contacting the filter 20. The release mechanism 148 includes a handle 150 disposed on the panel 146 and a button 152 slidably coupled to the handle 150. In the embodiment illustrated in FIG. 10, the release mechanism includes engagement members mechanically coupled to be movable by the button 152 or by a separate actuator. The engagement members are positioned to engage a flange on the filter inlet such as shown, for example, in FIG. 18A. Rather than touching the filter 20, the handle 150 is grasped by the operator to move the filter 20. The filter 20 is released from the panel 146 when the operator desires to dispose of the filter 20.

In the embodiment illustrated in FIGS. 8-10, the actuator is coupled to the conduit 132. The conduit 132 is in communication with the suction inlet 118. The actuator 130 is slideably coupled to the handle moveable between a first position (FIG. 9), in which the air conduit is positioned at least partially within the filter 20 (and therefore in fluid communication with the filter 20) and a second position in which the air conduit 132 is removed from the filter 20. While the actuator 130 is moving between the first and second positions, the conduit moves along a longitudinal axis. In operation, to install a new filter 20, an operator releases the panel 146 from the body 116 and couples the filter 20 to the panel 146. An operator re-connects the panel 146 to the body 116 and moves the actuator 130 from the first position to the second position. As a result, the conduit 132 moves into engagement with the valve 210 opening and displacing to the open position as the valve 210 is coupled to the free end 134 of the conduit 132. The actuator 130 remains in the second position. The air and debris drawn in from the suction inlet 118 passes through the conduit 132 and into the filter 20. When the filter 20 is full of debris, the operator moves the actuator 130 from the second position to the first position. This closes the valve 210 by lifting the valve 210 into the inlet 212 of the filter 20. The user grasps the handle 150 to disconnect the panel 146 from the body 113. The filter 20 drops from the panel 146 under gravity when desired.

The remaining figures and description illustrate and describe alternative embodiments of the filter 20 that can be used with the vacuum cleaners described above and method of manufacturing the filters.

Figure 11:
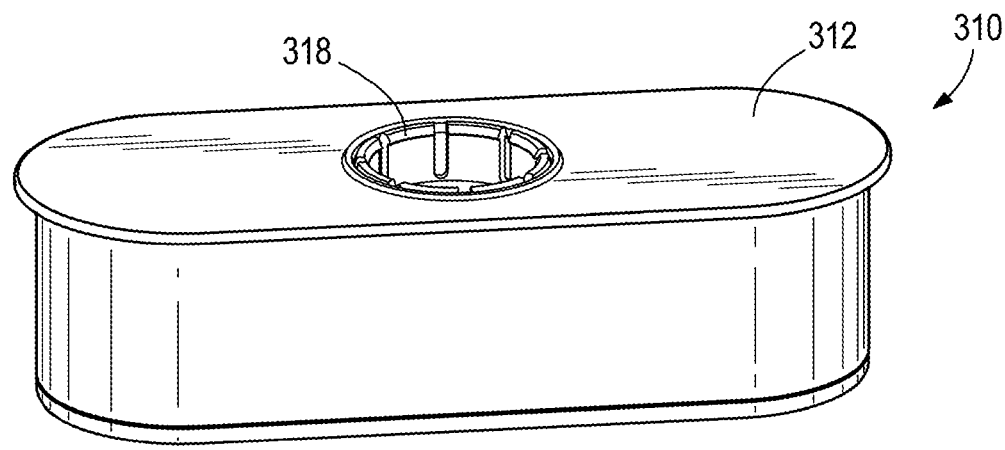
FIG. 11 is a perspective view of a filter in a collapsed position according to an embodiment.
Figure 12:
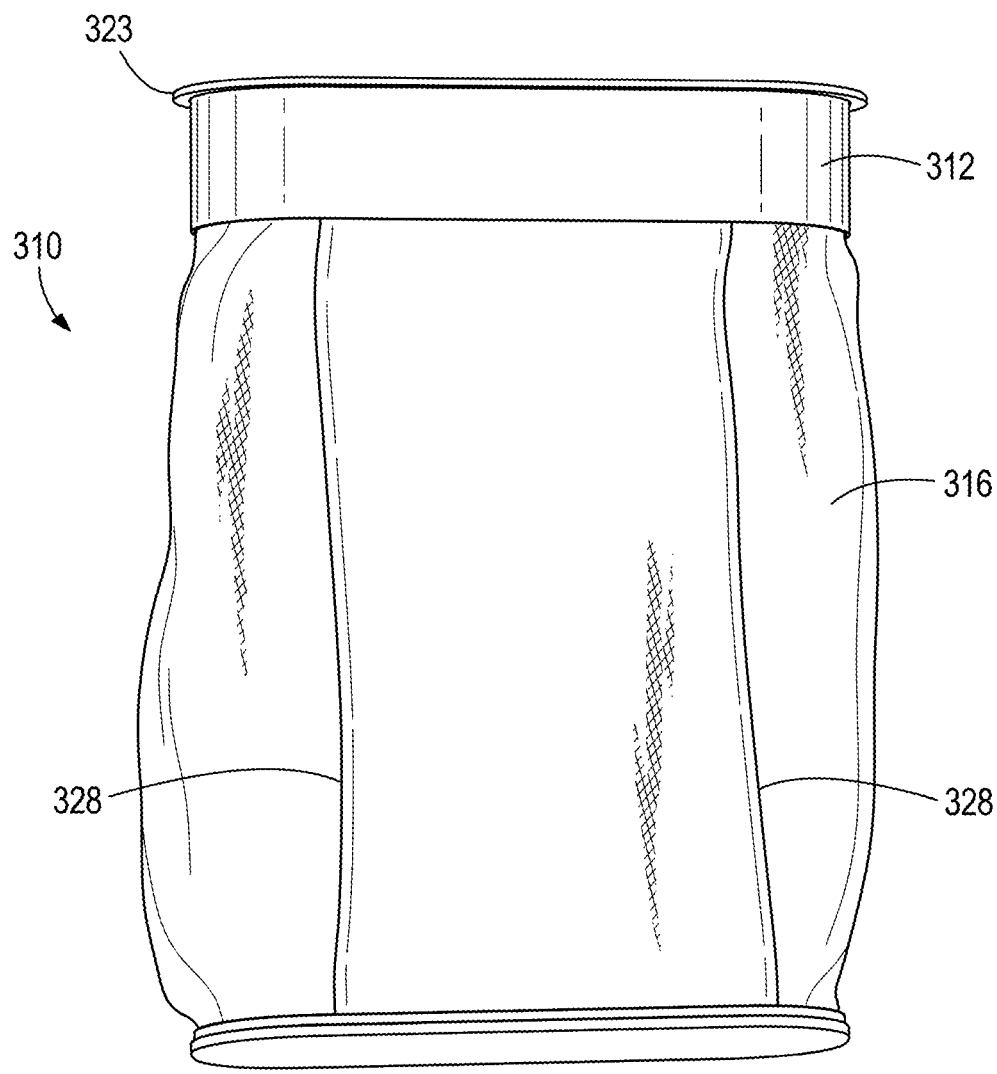
FIG. 12 is a perspective view of the filter of FIG. 11 in an expanded position.

FIGS. 11 and 12 illustrate a filter 310. The filter 310 can move between a collapsed position (FIG. 11) and an expanded position (FIG. 12). The filter 310 may be supplied to the consumer in the collapsed position. Then, in one embodiment, the filter 310 is installed in a device in the collapsed position and then automatically moves to the expanded position. The filter 310 can automatically move to the expanded position by air pressure, gravity, mechanical push or pull, etc. In an alternative embodiment, the consumer moves the filter to the expanded position prior to installing the filter into a device. The filter 310 can be used to filter any suitable fluid in several applications. For example, the filter 310 can be used in vacuum cleaners, air purifiers, HVAC systems, automotive applications, etc.

With reference to FIGS. 11 and 12, the filter 310 includes a first or upper housing 312, a second or lower housing 314, and filter media 316. The upper housing 312 includes an inlet opening 318 that provides fluid communication into the filter 310. In some embodiments, a valve 319 is located within the inlet opening 318 to open and close the inlet opening 318. For example, when the filter 310 is ready to be removed from the device (e.g., vacuum), the valve 319 is closed so that debris within the filter 310 does not escape through the inlet opening 318. The upper housing 312 has an inner volume 320 (see FIG. 15A) within the housing 312. Likewise, the lower housing 314 includes an inner volume 321. The inner volumes 320, 321 of the upper housing 312 and the lower housing 314 can be equal or one of the volumes can be greater than the other. In various alternatives, the inner volumes of one or both of the upper housing and the lower housing are small or inappreciable due to the shape of the housing. The upper housing 312 and the lower housing 314 can be formed from any suitable material, such as thermoplastic material, thermoset material, molded paper pulp, formed or molded filter media, or any other suitable material. Alternatively or additionally, the upper housing 312 forms a support collar 323 for installing the filter 310 in a vacuum cleaner.

Figure 13:
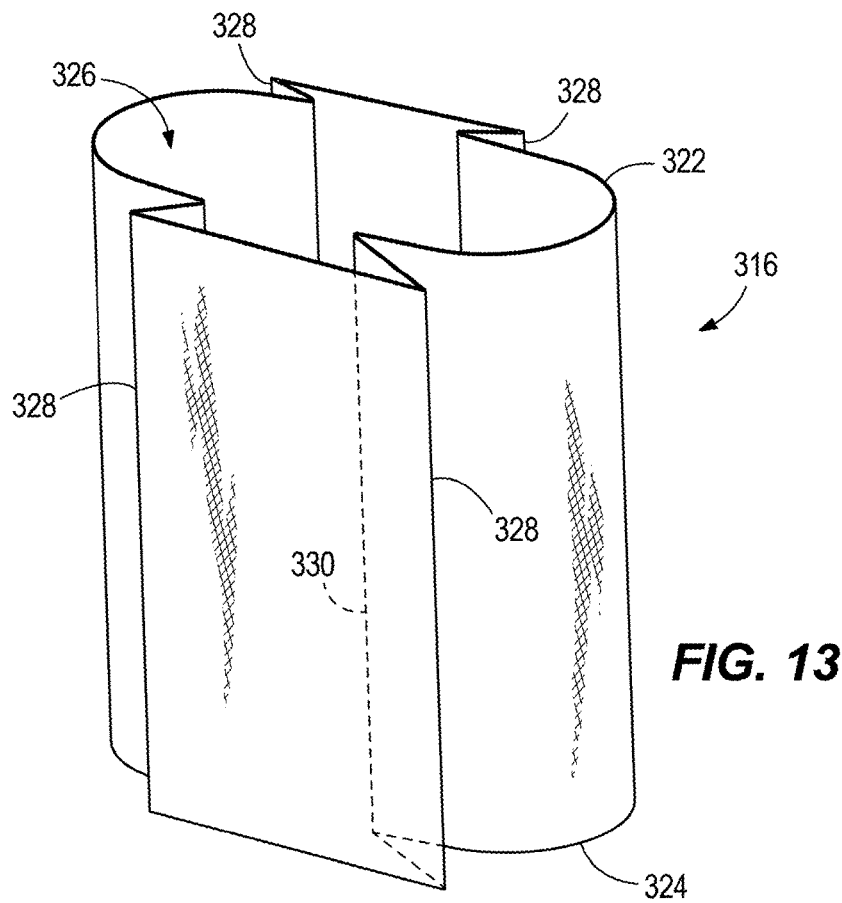
FIG. 13 is a perspective view of the filter of FIG. 12, illustrating filter media of the filter without an upper and lower housing.

With reference to FIG. 13, the filter media 316 includes a first end 322 and a second end 324. The filter media 316 is coupled to the upper housing 312 proximate the first end 322 while, the filter media 316 is coupled to the lower housing 314 proximate the second end 324. An inner volume 326 of the filter media 316 is defined between the first end 322 and the second end 324 of the filter media 316. Optionally, the filter media 316 includes one or more pleats 328 extending between the first end 322 and the second end 324. The pleats 328 enable the filter 310 to enlarge beyond the expanded position in a direction transverse to the direction traveled between the collapsed and expanded positions. In other words, the pleats 328 allow the filter 310 to billow outward in order to collect and store additional debris as the filter 310 fills. The illustrated filter media 316 typically includes a seam 330. Generally, the filter media 316 is a flat piece that is made tubular by joining two ends together, thereby creating the seam 330. As shown, the seam 330 is located within one of the pleats 328 to substantially hide the seam 330. The seam 330 can be formed by sewing, heat welding, crimping, or other suitable means of coupling the two ends together.

With reference to FIGS. 11 and 12, the filter 310 can move between a collapsed position (FIG. 11) and an expanded position (FIG. 12). In the collapsed position, the filter media 316 is located within the inner volume 320 of the upper housing 312 and/or in the inner volume of the lower housing 314. Also, the upper housing 312 and the lower housing 314 enclose the filter media 316 in the collapsed position. In some embodiments, the upper housing 312 and/or lower housing 314 can snap or otherwise connect together to retain the filter 310 in the collapsed position by interlocking features provided in the upper and lower housings. Alternatively, the filter 310 may be held in the collapsed position by tape, film, bag, or other attachments. Typically, the filter 310 would be supplied to the user in the collapsed position. In the expanded position, the filter media 316 generally expands out to an operative length and is ready for use as a filter. In some applications, the filter 310 automatically moves from the collapsed position to the expanded position. For example, when a flow of dirty fluid enters the filter 310 through the inlet opening 318, the pressure of the fluid automatically expands the filter 310. In other applications, gravity may automatically expand the filter 310, or a mechanism may be used to push or pull one or both housings away from the other.

The inner volume 326 of the filter media, along with the inner volume 320 of the upper housing 312, and the inner volume 321 of the lower housing 314 together define a collection container 332 that stores debris separated by the filter media 316. That is, a dirty fluid (e.g., air and dust, dirt, or other particles) travels into the filter 310 through the inlet opening 318. The dirt or dust is separated from the air flow by the filter media 316 and relatively clean air flows out of the filter 310 through the filter media 316 between the housings 312, 314. This airflow is generally represented by the arrows 334.

Figure 15B:
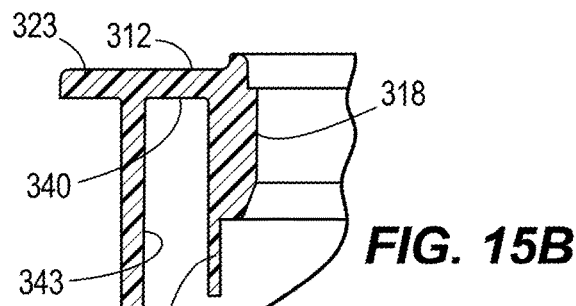
FIG. 15B is a cross-sectional view of the filter along line 15B-15B of FIG. 15A.
Figure 15A:
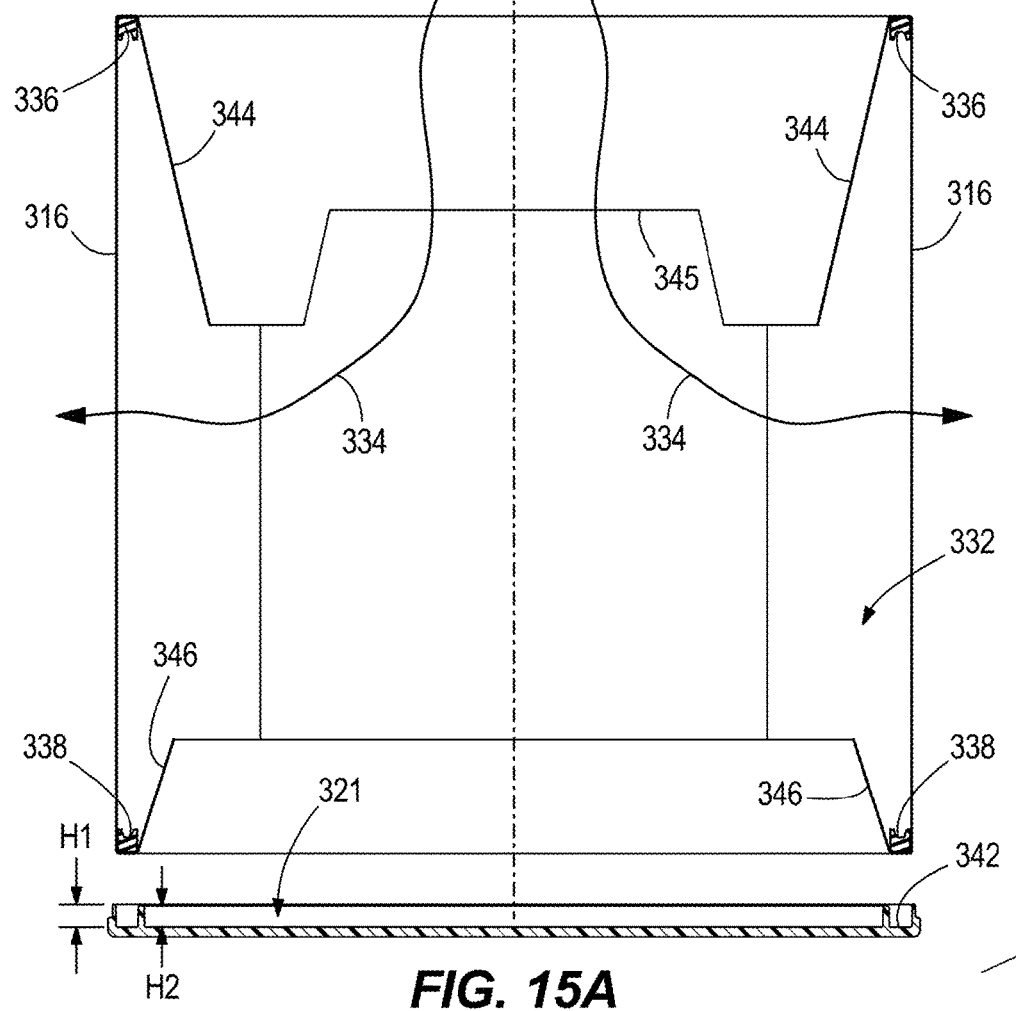
FIG. 15A is an exploded cross-sectional view of the filter in the expanded position.

The filter 310 further includes a first attachment member 336 that couples the filter media 316 to the upper housing 312. In the illustrated embodiments, the filter media is folded over the first attachment member 336 between the first end 322 and the second end 324 of the filter media 316, but generally closer to the first end 322, before it is connected to the upper housing 312. Stated another way, all or a portion of the first end 322 of the filter media 316 is folded over before being coupled to the upper housing 312. Similarly, the filter 310 includes a second attachment member 338 that couples the filter media 316 to the lower housing 314 between the first end 322 and the second end 324 of the filter media 316, but closer to the second end 324. The first attachment member 336 is received within a groove 340 at the upper housing 312 holding the filter media in place, whereas the second attachment member 338 is received within a groove 342 of the lower housing 314. The grooves 340, 342 are formed with an inner wall 341 and an outer wall 343 (FIG. 15B). As shown in FIG. 15A, the height H1 of the outer wall 343 is greater than the height H2 of the inner wall 341. In an alternative embodiment, the height H1 of the outer wall 343 is the same as the height H2 of the inner wall 341.

To couple the filter media 316 to the upper housing 312 in the illustrated embodiment, all or a portion of the end of the filter media 316 is folded over the first attachment member 336 and fitted into the groove 340 of the upper housing 312. As such, the filter media 316 is disposed between the groove 340 and the first attachment member 336. The fit between the groove 340 and the attachment member 336 with filter media 316 is a friction or limited clearance fit to wedge the filter media 316 and attachment member 336 into the groove 340 to couple the filter media 316 to the upper housing 312. Alternatively, the attachment member 336 is staked, welded, snap fit, adhered, or otherwise fastened to the upper housing 312 to couple the filter media 316 to the upper housing 312. In one alternative, at least a portion of the edge 322 of the first end 322 of the filter media 316 is retained in the groove 340 by fitting the attachment member 336 into the groove 340. The connection of the filter media 316 to the upper housing 312 is provided around the upper housing 312 inhibiting airflow through the connection.

To couple the filter media 316 to the lower housing 314, the filter media 316 is wrapped around the second attachment member 338 and fitted into the groove 342 of the lower housing 314 in a similar way as described for the filter media 316 coupling to the upper housing 312. As such, the filter media 316 is retained in the groove 342 by fitting the second attachment member 338 into the groove 342. The connection of the filter media 316 to the lowers housing 314 is provided around the lower housing 314 inhibiting airflow through the connection. In various alternatives, the connection of the filter media 316 to the lower housing 314 may use a different method than the connection to the upper housing 312. In one alternative, the filter media 316 does not use a lower housing 314, instead closing the second end 324 with a seam or other closure.

Figure 14:
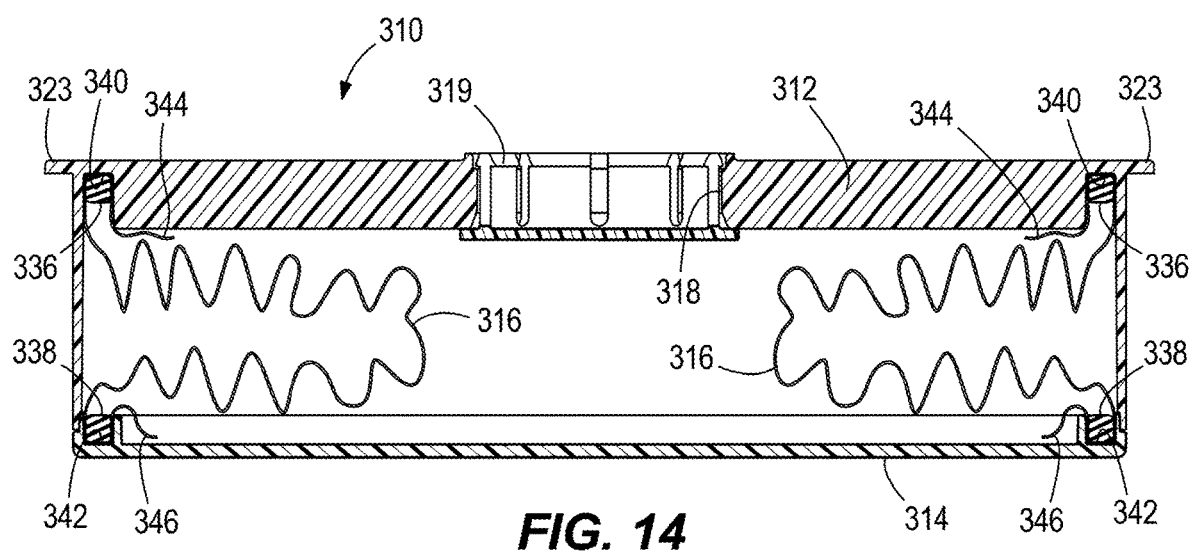
FIG. 14 is a cross-sectional view of the filter in the collapsed position.
Figure 16:
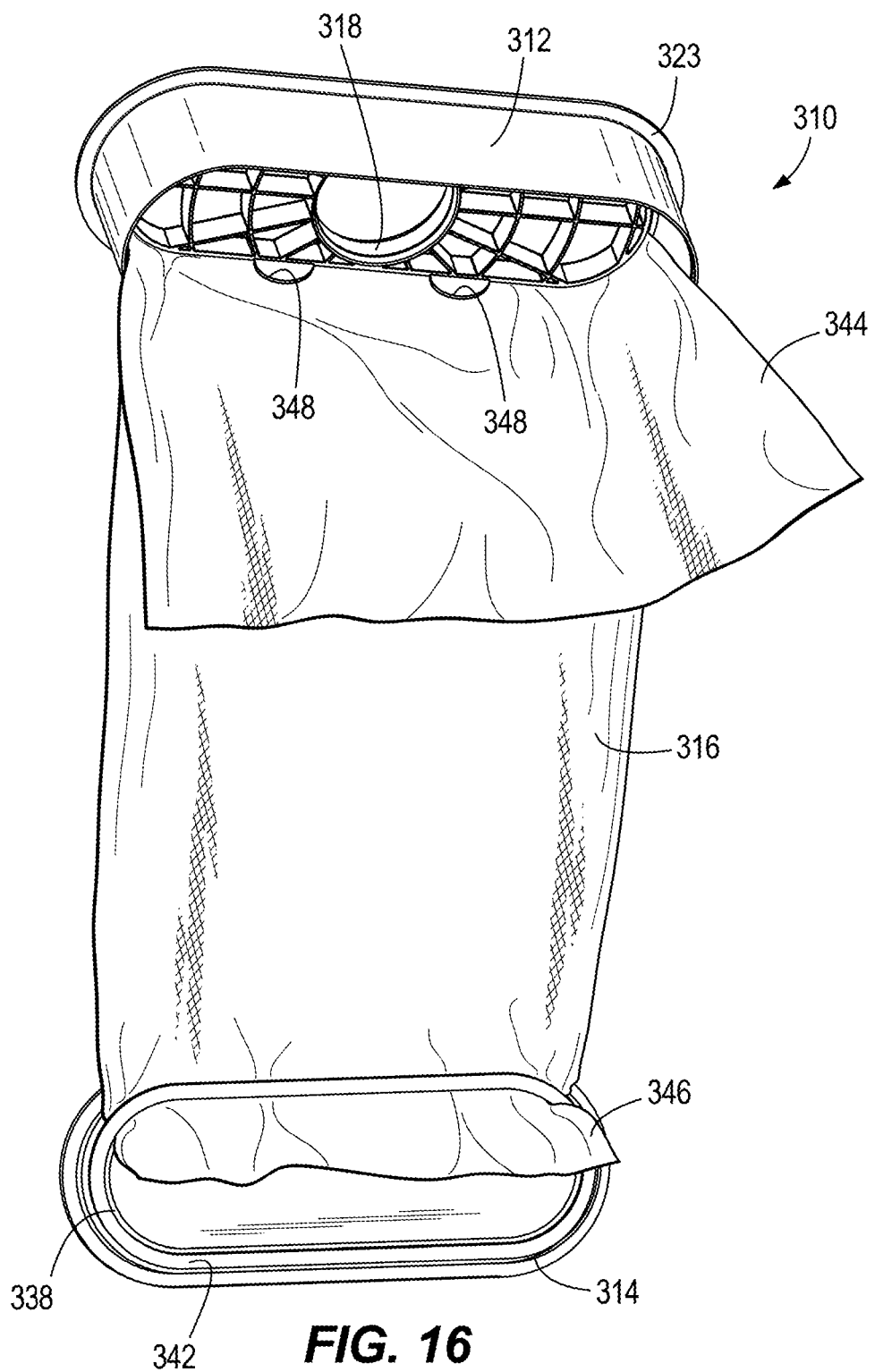
FIG. 16 is a perspective view of an interior of the filter with a portion of the filter media cutaway.

With continued reference to FIGS. 14-16, the filter 310 may include a first overlapping filter media section 344 and a second overlapping filter media section 346. The first overlapping filter media section 344 is proximate the upper housing 312 and is a result of the first end 322 of the filter media 316 being folded such that at least a portion of the first end 322 extends away from the housing 312 forming the overlapping filter media section 344. In the illustrated embodiment, the first end 322 of the filter media 316 is folded over the attachment member 336 in a manner that the first end 322 extends away from the upper housing 312 a desired length. As such, the filter media 316 overlaps to provide two layers at the first overlapping filter media section 344. The first overlapping filter media section 344 may extend around the perimeter of the filter 310 or may extend along one or more portions of the perimeter of the filter 310. In certain embodiments, all or desired portions of the overlapping filter media 344 may be trimmed, or filter media 316 positioned such that a desired amount of filter media 316 extends beyond the attachment member 336 in predetermined locations. In the embodiment shown in FIG. 15A, the first overlapping filter media section 344 includes a notch 345 in a portion. The notch 345 inhibits the conduit 60 from catching on the filter media section 344 when the conduit 60 moves into and out of the filter. The second overlapping filter media section 46 is proximate the lower housing 314 and is a results of the second attachment member 338 bending the filter media 316 in a manner that the second end 324 extends away from the lower housing 314. As such, the filter media 316 overlaps to provide two layers and forms the second overlapping filter media section 346. The second overlapping filter media section 346 may extend around the perimeter of the filter 310 or may extend along one or more portions of the perimeter of the filter 310. In certain embodiments, all or desired portions of the overlapping filter media 46 may be trimmed, or filter media 316 positioned such that a desired amount of filter media 316 extends beyond the second attachment member 338 in predetermined locations. In the illustrated embodiment, both of the first and second overlapping filter media sections 344, 346 are disposed in the inner volume 326 of the filter media 316. However, for certain embodiments the filter 310 may be constructed with the overlapping filter media portions 344, 346 being positioned to the outside of the filter 310.

As shown in FIGS. 15A and 16, the upper housing 312 may include one or more extension members 348 adjacent the groove 340. The extensions members 348 are positioned in a location to direct the overlapping filter media section 344 to extend in a direction along the outer wall 343 of the upper housing 312 and filter media 316. The extension members 348 may be integrally formed with the upper housing 312 or may be formed separately and installed in the filter 310.

As previously mentioned, the first overlapping filter media section 344 is proximate the upper housing 314. The length and width and location of the first overlapping filter media section 344 or the second overlapping filter media section 346 may be provided where it is in a direct path of some or all of the airflow (see arrow 334 of FIG. 17A) exiting the device (e.g., a discharge conduit of a vacuum) to receive impact of impinging debris as the debris enters the filter 310.

One or both of the attachment members 336, 338 may include a recess, protrusion, or other shape 350 configured for nesting or attaching to a fixture provided to guide the attachment member 336, 338 into the groove 340, 342. As shown in FIGS. 17B and 17C, the attachment member 336, 338 may include the fixturing recess, protrusion, or other shape 350 on the side facing out of the groove 340, 342.

Figure 18A:
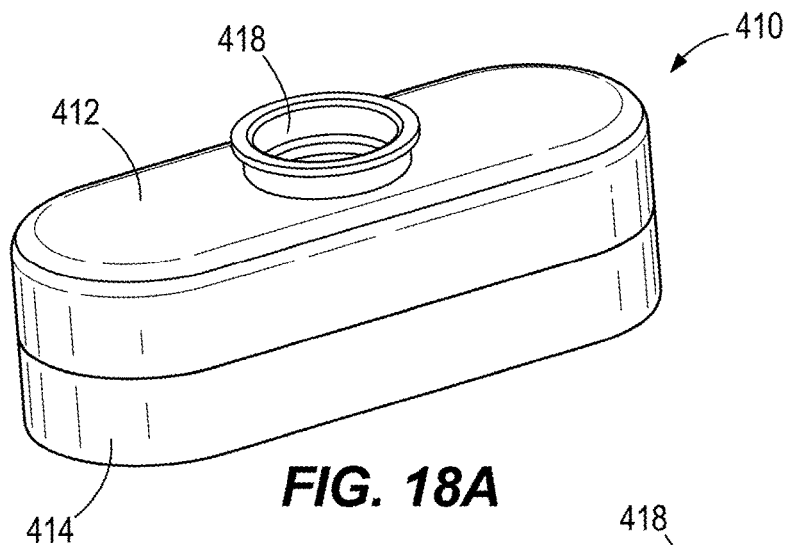
FIG. 18A is a perspective view of a filter in a collapsed position according to an embodiment.
Figure 18B:
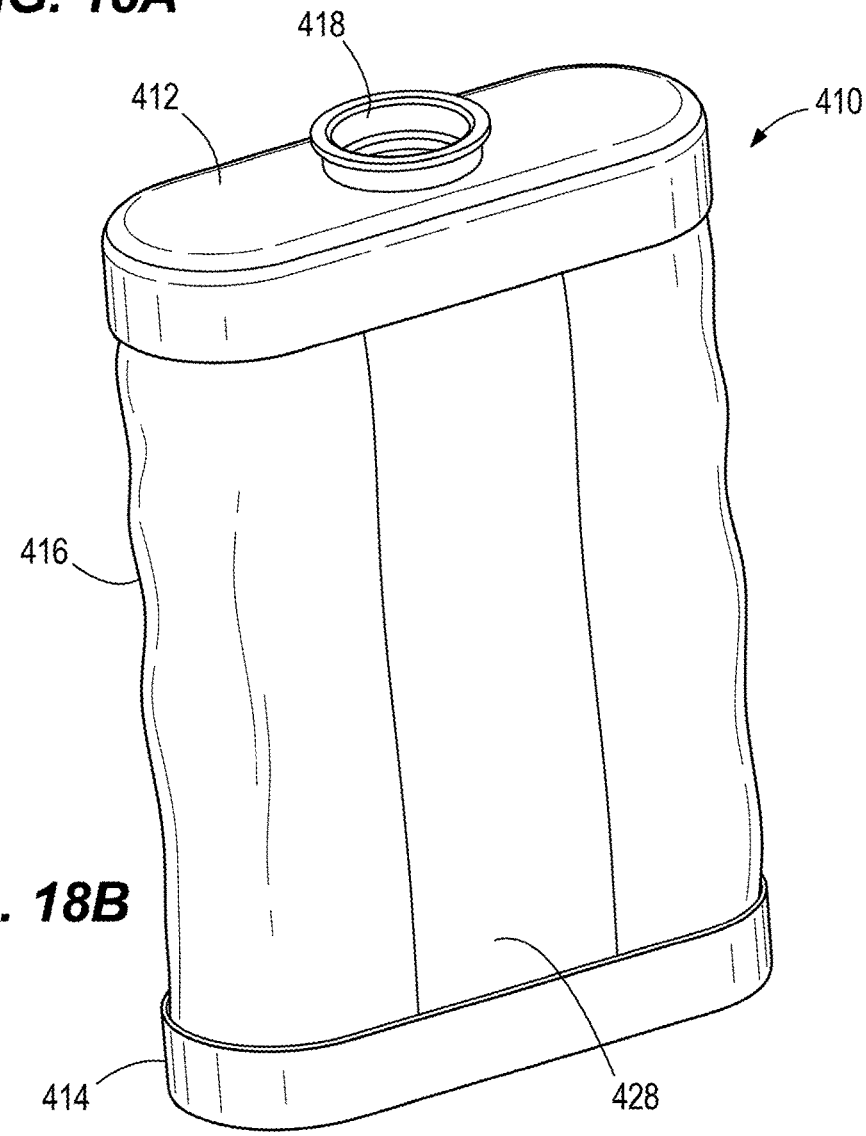
FIG. 18B is a perspective view of the filter of FIG. 18A in an expanded position.

FIGS. 18A and 18B illustrate a filter 410. The filter 410 can move between a collapsed position (FIG. 18A) and an expanded position (FIG. 18B). The filter 410 may be supplied to the consumer in the collapsed position. Then, in one embodiment, the filter 410 is installed in a device in the collapsed position and then automatically moves to the expanded position. The filter 410 can automatically move to the expanded position by air pressure, gravity, mechanical push or pull, etc. In an alternative embodiment, the consumer moves the filter to the expanded position prior to installing the filter into a device. The filter 410 can be used to filter any suitable fluid in several applications. For example, the filter 410 can be used in vacuum cleaners, air purifiers, HVAC systems, automotive applications, etc.

Referring to FIGS. 18A and 18B, the filter 410 includes a first or upper housing 412, a second or lower housing 414, and filter media 416. The upper housing 412 includes an inlet opening 418 that provides fluid communication into the filter 410. In some embodiments, a valve is located within the inlet opening 418 to open and close the inlet opening 418. For example, when the filter 410 is ready to be removed from the device (e.g., vacuum), the valve is closed so that debris within the filter 410 does not escape through the inlet opening 418. The upper housing 412 has an inner volume 420 (see FIG. 27A) within the housing 412. Likewise, the lower housing 414 includes an inner volume. The inner volumes of the upper housing 412 and the lower housing 414 can be equal or one of the volumes can be greater than the other. The upper housing 412 and the lower housing 414 can be formed from any suitable material, such as thermoplastic material, thermoset material, molded paper pulp, formed or molded filter media, or any other suitable material.

Figure 27A:
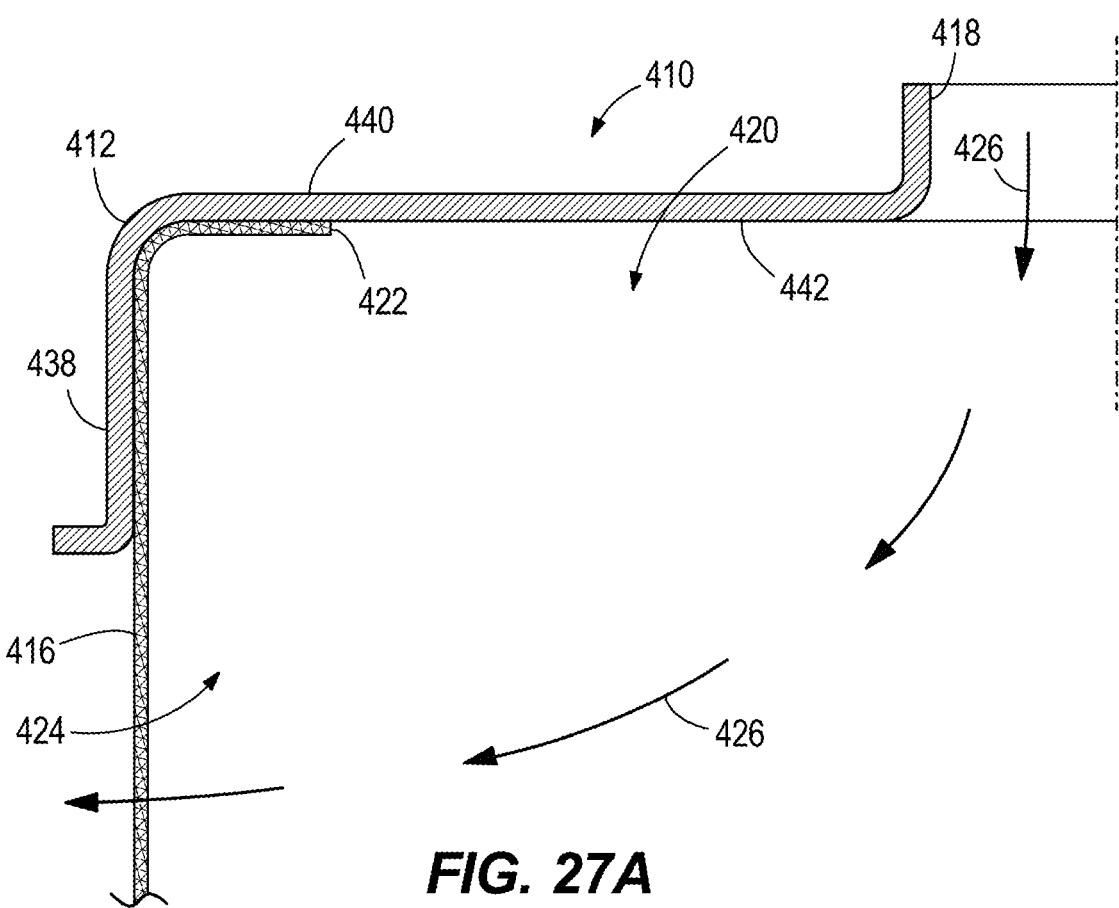
FIG. 27A is a cross-sectional view of a filter according to an embodiment.

The filter media 416 includes a first end 422 (see FIG. 27A). The filter media 416 is coupled to the upper housing 412 at the first end 422. Likewise, the filter media 416 has a second end and the filter media 416 is coupled to the lower housing 414 at the second end. As will be discussed in more detail below, the first and second ends of the filter media 416 can be attached to the housings 412, 414 using a variety of methods. An inner volume 424 (see FIG. 27A) of the filter media 416 is defined between the first end 422 and the second end (not shown in FIG. 27A) of the filter media 416.

The inner volume 424 of the filter media, along with the inner volume 420 of the upper housing 412, and the inner volume of the lower housing 414 together define a collection container 425 that stores debris separated by the filter media 416. That is, a dirty fluid (e.g., air and dust, dirt, or other particles) travels into the filter 410 through the inlet opening 418. The dirt or dust is separated from the air flow by the filter media 416 and relatively clean air flows out of the filter 410 through the filter media 416 between the housings 412, 414. This airflow is generally represented by the arrows 426 in FIG. 27A.

Referring to FIG. 18B, in one embodiment, a panel 428 is located at a seam of the filter media 416, for example along a vertical seam. In one alternative, the panel 428 is clear to allow a user to see how much debris is in the filter 410 to indicate to the user when the collection container 425 is full. In addition or in other embodiments, the panel 428 can be decorative and/or can include odor absorbing material.

Figure 18C:
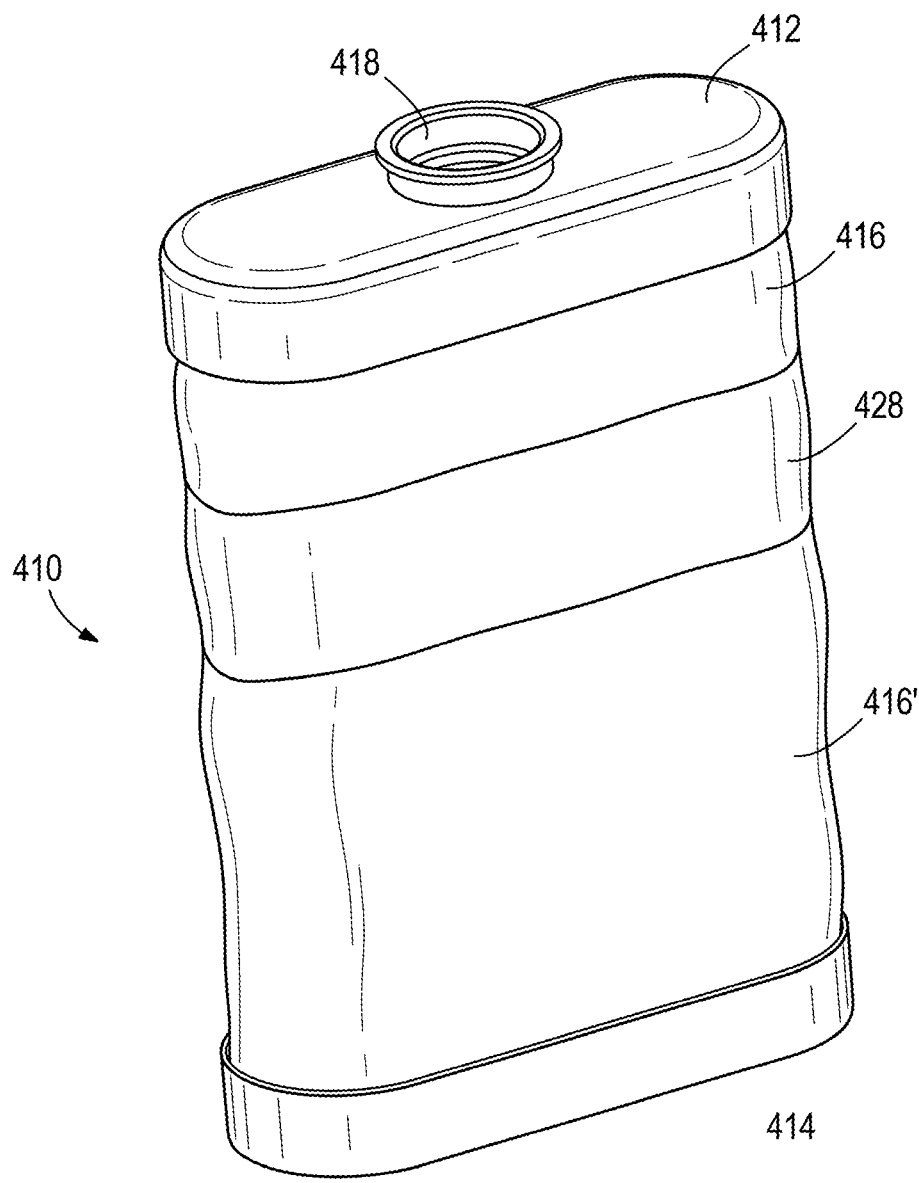
FIG. 18C is a perspective view of an alternative embodiment of the filter of FIG. 18A in an expanded position.

Referring to FIG. 18C, in an alternative embodiment, the filter may be constructed such that the optional panel 428 may be provided along a horizontal seam. In this construction, the filter media 416 is divided into two sections, and the filter media 416 is attached to the housing 412. The second piece of filter media 416' is attached to the filter media 416, optionally with the panel 428 provided along the horizontal seam between the filter media sections 416, 416'.

Referring to FIGS. 18A and 18B, the filter 410 can move between a collapsed position (FIG. 18A) and an expanded position (FIG. 18B). In the collapsed position, the filter media 416 is located within the inner volume 420 (the inner volume being shown in one embodiment in FIG. 27A) of the upper housing 412 and/or in the inner volume of the lower housing 414. Also, the upper housing 412 and the lower housing 414 enclose the filter media 416 in the collapsed position. In some embodiments, the upper housing 412 and/or lower housing 414 can snap or otherwise connect together to retain the filter 410 in the collapsed position by interlocking features provided in the upper and lower housings. Alternatively, the filter 410 may be held in the collapsed position by tape, film, bag, or other attachments. Typically, the filter 410 would be supplied to the user in the collapsed position. In the expanded position, the filter media 416 generally expands out to an operative length and is ready for use as a filter. In some applications, the filter 410 automatically moves from the collapsed position to the expanded position. For example, referring to FIG. 27A, when a flow of dirty fluid (represented by arrows 426) enters the filter 410 through the inlet opening 418, the pressure of the fluid automatically expands the filter 410. In other applications, gravity may automatically expand the filter 410, or a mechanism may be used to push or pull one or both housings away from the other.

Figure 19A:
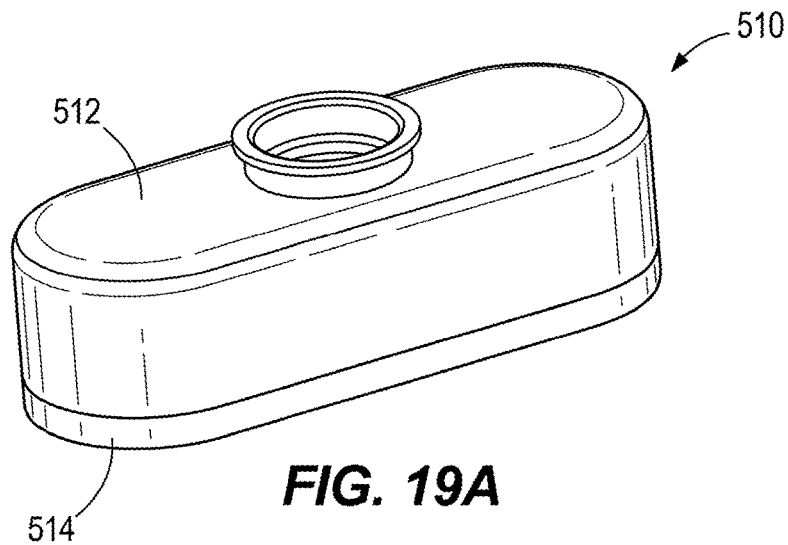
FIG. 19A is a perspective view of a filter in a collapsed position according to an embodiment.
Figure 19B:
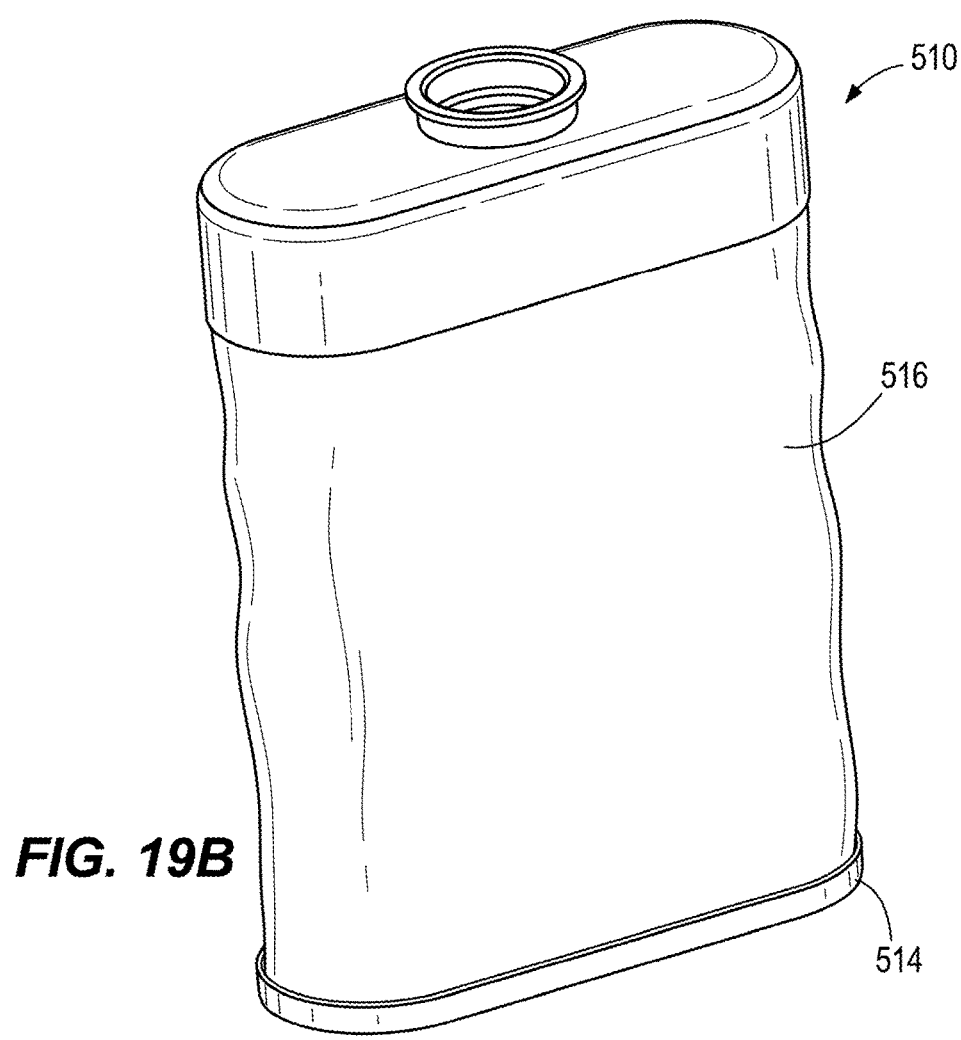
FIG. 19B is a perspective view of the filter of FIG. 19A in an expanded position.

FIGS. 19A and 19B illustrate a filter 510 according to another embodiment. The filter 510 includes features similar to the filter 410 of FIGS. 18A and 18B and only some differences between the filters 410, 510 will be discussed. The filter 510 includes a lower housing 514 that is generally flat and has very little, if any, inner volume. In the illustrated embodiment, in the collapsed position, the filter media 516 is virtually entirely received in the inner volume of the upper housing 512. In this embodiment, the lower housing 514 functions as a cap to close the upper housing 512 and retain the filter media 516 in the collapsed position. Alternatively, at least a portion of the filter media 516 is received in the inner volume of the upper housing 512.

Figure 20A:
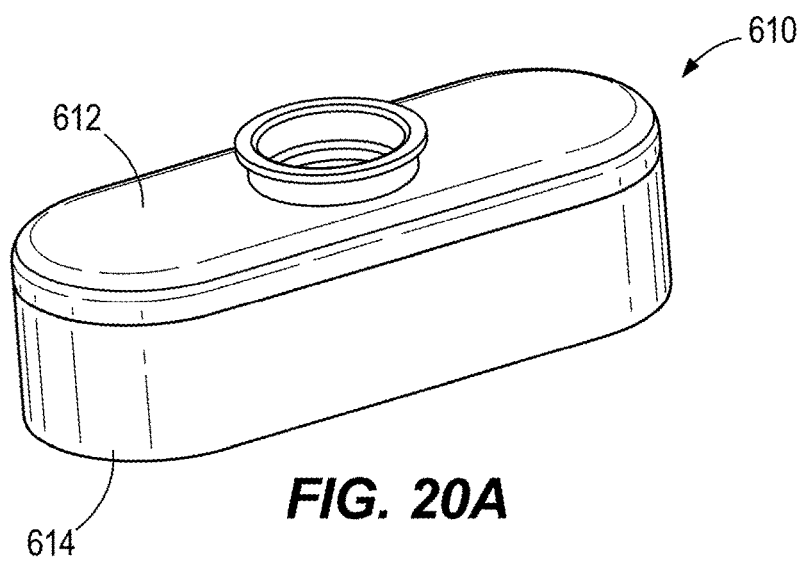
FIG. 20A is a perspective view of a filter in a collapsed position according to an embodiment.
Figure 20B:
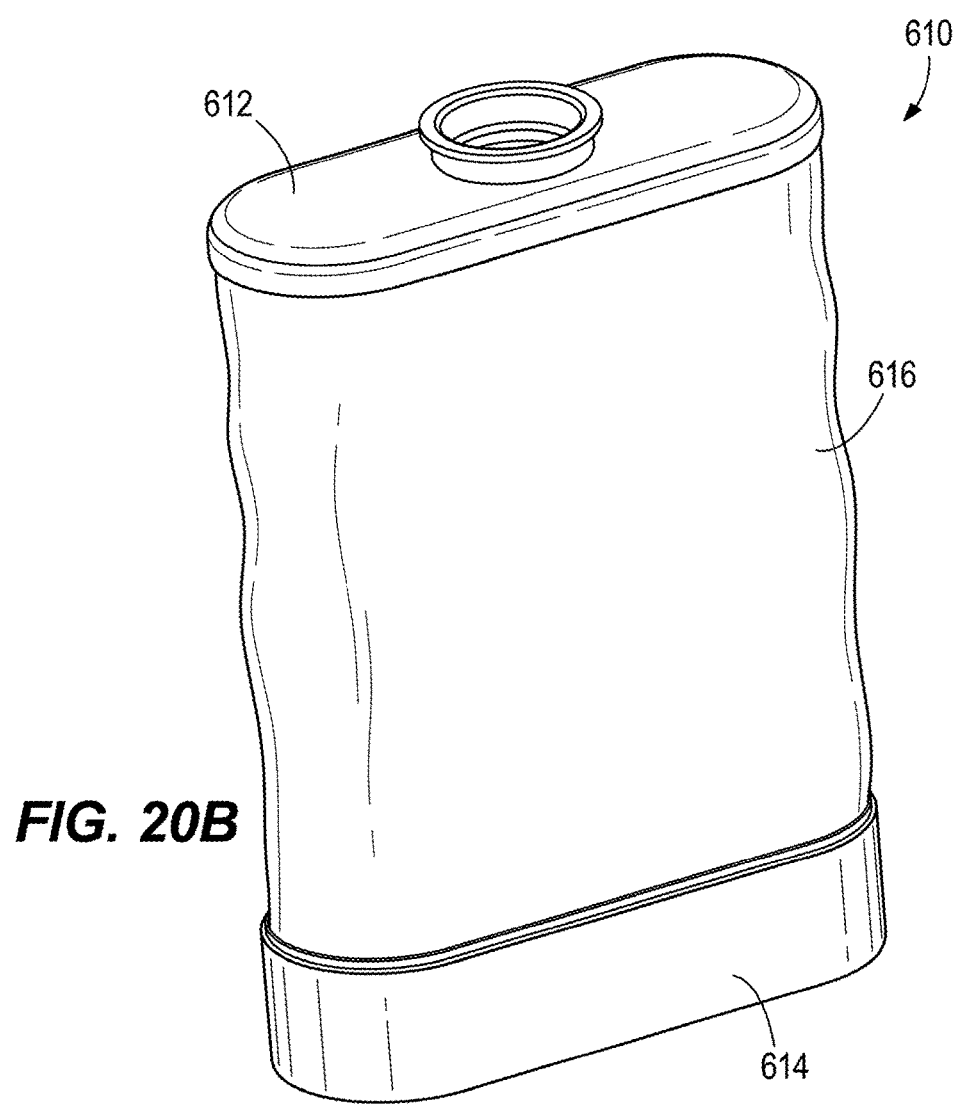
FIG. 20B is a perspective view of the filter of FIG. 20A in an expanded position.

FIGS. 20A and 20B illustrate a filter 610 according to another embodiment. The filter 610 includes features similar to the filters discussed above and only some differences between the filters will be discussed. The filter 610 includes an upper housing 612 that is generally flat and has very little, if any, inner volume. In the illustrated embodiment, in the collapsed position, the filter media 616 is virtually entirely received in the inner volume of the lower housing 614. In this embodiment, the upper housing 612 functions as a cap to close the lower housing 614 and retain the filter media 616 in the collapsed position. Alternatively, at least a portion of the filter media 616 is received in the inner volume of the lower housing 614.

Figure 21A:
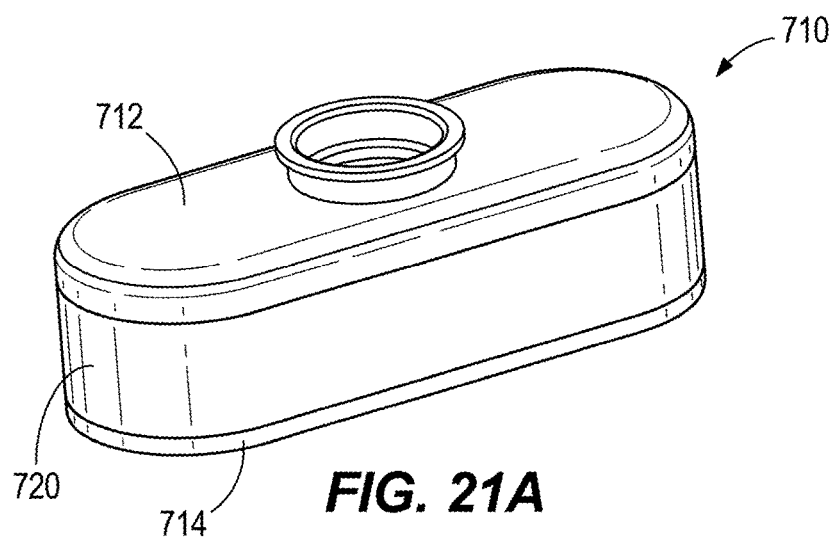
FIG. 21A is a perspective view of a filter in a collapsed position according to an embodiment.
Figure 21B:
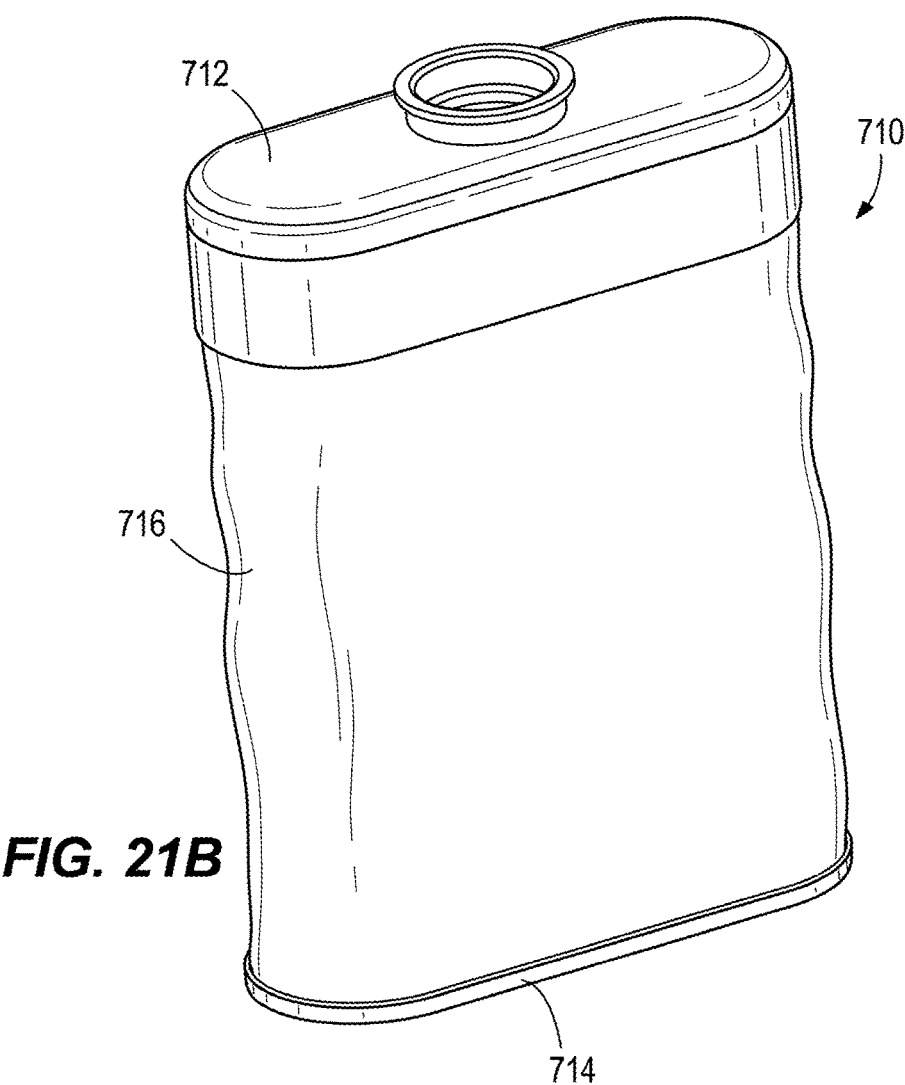
FIG. 21B is a perspective view of the filter of FIG. 20A in an expanded position.
Figure 22A:
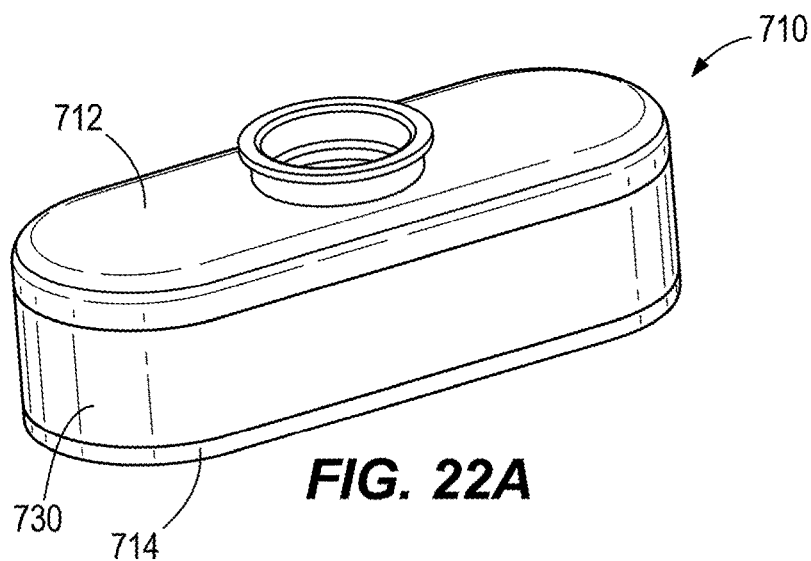
FIG. 22A is a perspective view of a filter in a collapsed position according to an embodiment.
Figure 22B:
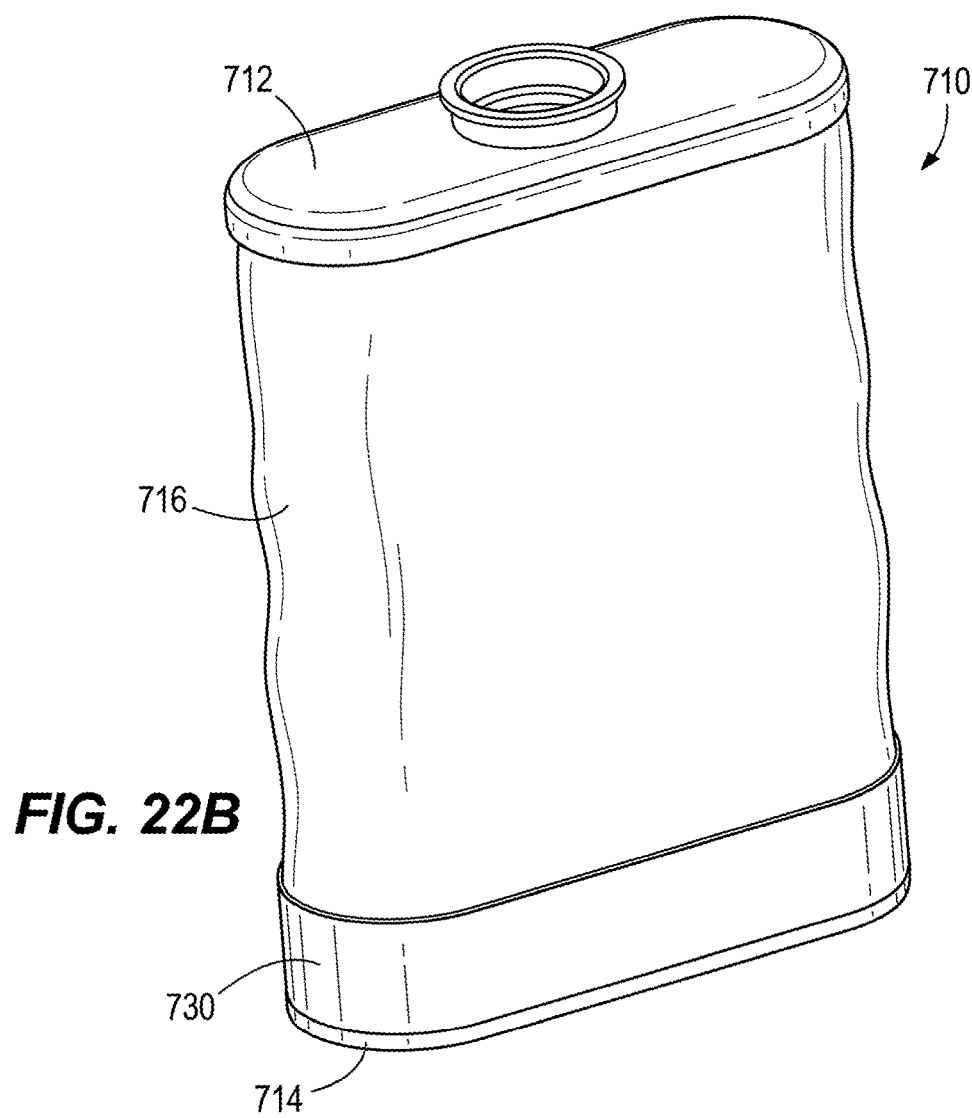
FIG. 22B is a perspective view of the filter of FIG. 22A in an expanded position.

FIGS. 21A, 21B, 22A and 22B illustrate a filter 710 according to another embodiment. The filter 710 includes features similar to the filters discussed above and only some differences between the filters will be discussed. The filter 710 includes an upper housing 712 and a lower housing 714 and either or both of the upper and lower housings may be generally flat or may have an inner volume. The filter 710 further includes an intermediate portion 730. In the illustrated embodiment, in the collapsed position, the filter media 716 is received between the housings 712, 714 and surrounded and enclosed by the intermediate portion 730. In some embodiments, the intermediate portion 730 is a tear-away style component that remains attached to either the upper housing 712 or the lower housing 714. For example, there is a perforation or similar attachment between the intermediate portion 730 and the upper housing 712 and/or lower housing 714. The perforation is torn or broken to allow the filter 710 to move to the expanded position (FIG. 21B). FIG. 21B illustrates the intermediate portion 730 remaining attached to the upper housing 712 in the expanded position. FIG. 22B illustrates the intermediate portion 730 remaining attached to the lower housing 714 in the expanded position. In yet another alternative, the intermediate portion is connected to the upper housing and/or lower housing with engaging features such as snap-fits, friction-fits, protrusions, tabs, hooks, interlocks, or other features that engage corresponding features such as recesses, openings, snap-fits, friction-fits, tabs, protrusions, hooks, interlocks, or other features to connect the intermediate portion with the adjacent housing. Engaging features between the intermediate portion and adjacent housings may be configured so that the connection to one of the adjacent housings is stronger than the connection to the other housing to control whether the intermediate portion remains with the upper housing or the lower housing when moving to the expanded position.

Figure 23A:
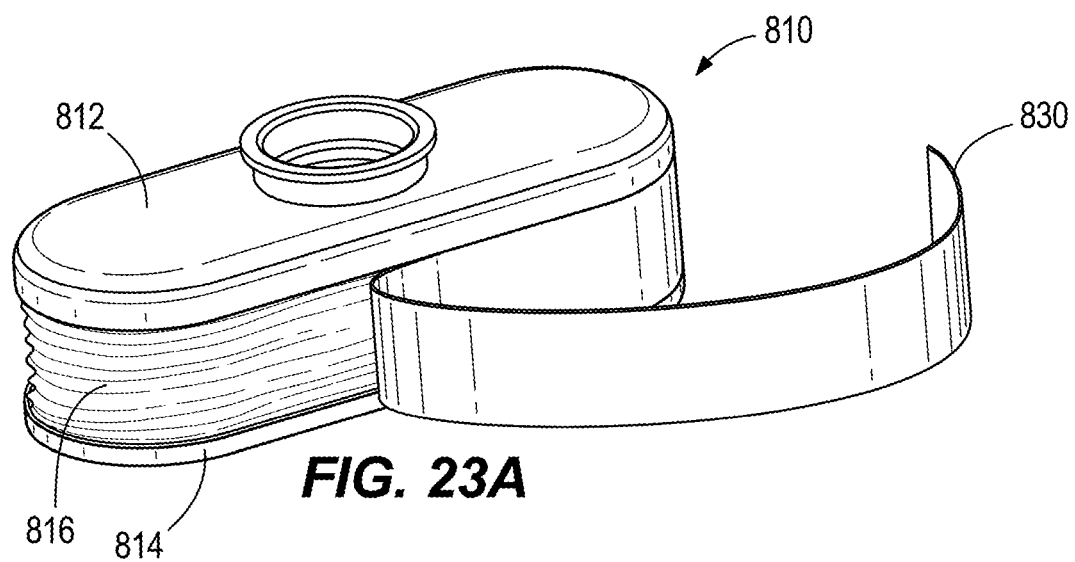
FIG. 23A is a perspective view of a filter in a collapsed position according to an embodiment.
Figure 23B:
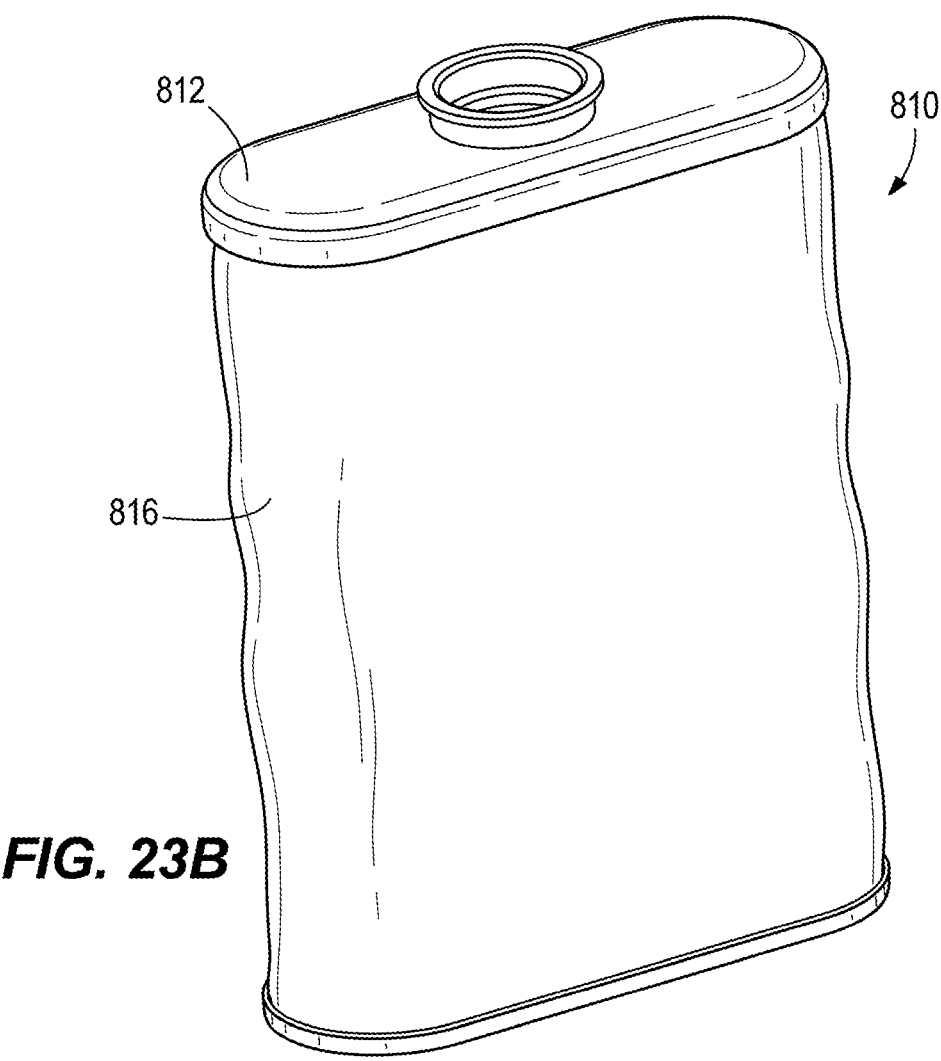
FIG. 23B is a perspective view of the filter of FIG. 23A in an expanded position.

FIGS. 23A and 23B illustrate a filter 810 according to another embodiment. The filter 810 includes features similar to the filters discussed above and only some differences between the filters will be discussed. In the illustrated embodiment, the filter 810 includes an upper housing 812 and a lower housing 814 and either or both of the upper and lower housings may be generally flat or may have an inner volume. The filter 810 further includes an intermediate portion 830, and in the collapsed position, the filter media 816 is virtually entirely received between the housings 812, 814 and surrounded and enclosed by the intermediate portion 830. In the illustrated embodiment, the intermediate portion 830 is a tear-away style component that the user removes (as illustrated in FIG. 23A) from connection with both housings 812, 814 before using the filter 810. In some embodiment, the intermediate portion 830 can be formed by paper, film, tape, paperboard, a sleeve, or other suitable components. In one alternative, the intermediate portion and the lower housing are combined into one removable or tear-away component, with the bottom of the filter media being closed with a seam.

Figure 24A:
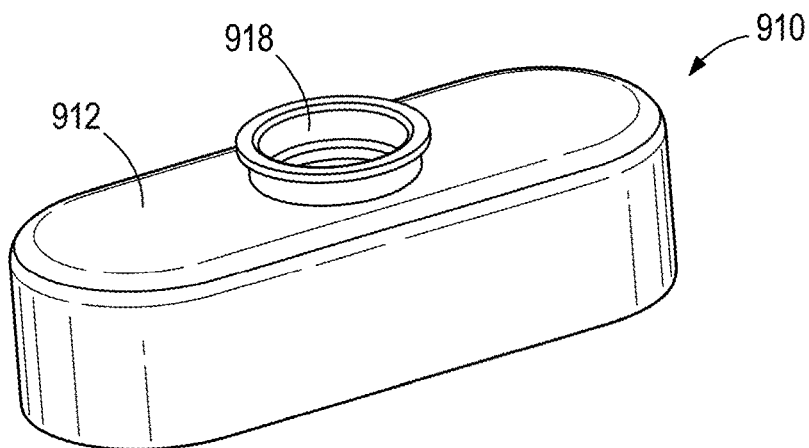
FIG. 24A is a perspective view of a filter in a collapsed position according to an embodiment.
Figure 24B:
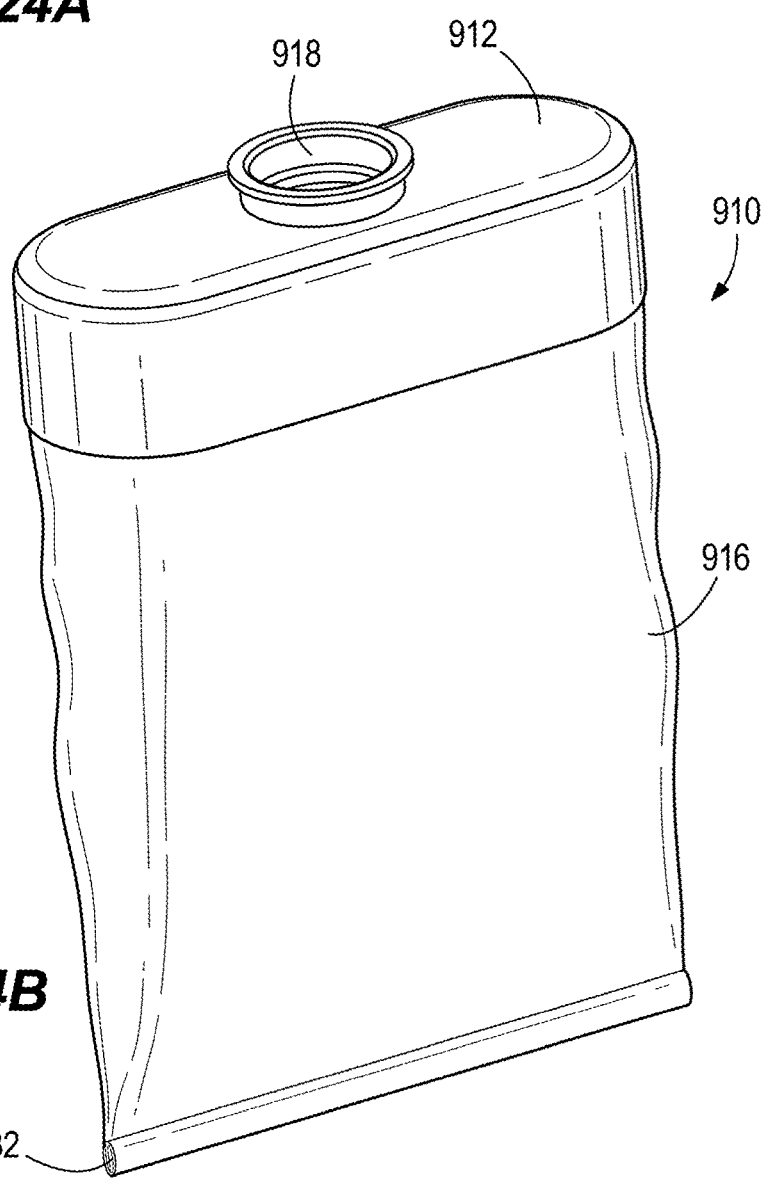
FIG. 24B is a perspective view of the filter of FIG. 24A in an expanded position.

FIGS. 24A and 24B illustrate a filter 910 according to another embodiment. The filter 910 includes features similar to the filters discussed above and only some differences between the filters will be discussed. The filter 910 includes an upper housing 912 similar to the housing 412 of the filter 410 of FIGS. 18A and 18B. The filter 910 further includes a lower end 932 of the filter media 916 that is closed with a seam, illustrated in FIG. 24B as a flat seam or rolled seam. In the collapsed position, the filter media 916 is entirely received in the inner volume of the upper housing 912. In some embodiments, the filter media 916 is enclosed in the collapsed position in the upper housing 912 by a closure device on the bottom of the upper housing 912. The closure device can include film, foil, paper, a cap, tape, bag, sleeve, or other suitable devices holding the filter media 916 and the upper housing 912 in the collapsed position. The closure device may include a perforation, slit, tear line, or hinge that allows the filter media 916 to move to the expanded position. In some embodiments, the closure device or cover would remain in place during and after installation of the filter 910 in the device. Then, the device may include a feature that automatically opens or shears the cover allowing the filter media to move to the expanded position. Alternatively or in addition, airflow from the device through the inlet opening 918 causes the filter media 916 to automatically expand and tear, push, and/or swing open the closure device, automatically expanding the filter 910. In other embodiments, the closure device may be removed, such as by peeling or tearing, by the user before or immediately after installing the filter 910.

FIGS. 25A-25C illustrate a filter 1010 according to another embodiment. The filter 1010 includes features similar to the filters discussed above and only some differences between the filters will be discussed. The filter 1010 includes an upper housing 1012 similar to the housing 412 of the filter 410 of FIGS. 18A and 18B or any other disclosed embodiment. The filter 1010 further includes a lower end of the filter media 1016 that includes a gusset bottom 1034. The gusset bottom 1034 can be formed from media material, thermoplastic molded or die cut material, film, foil, or other suitable materials. In some embodiments, the gusset bottom 1034 is air permeable. Also in some embodiments, the gusset bottom 1034 can be a self-standing type gusset. In the collapsed position, the filter media 1016 is at least partially received in the inner volume of the upper housing 1012. In some embodiments, the filter media 1016 is enclosed in the collapsed position in the upper housing 1012 by a closure device on the bottom of the upper housing 1012. The closure device can include film, foil, paper, a cap, tape, bag, sleeve, or other suitable devices holding the filter media 1016 and the upper housing 1012 in the collapsed position. The closure device may include a perforation 1069, slit, tear line, or hinge that allows the filter media 1016 to move to the expanded position. In some embodiments, the closure device or cover would remain in place during and after installation of the filter 1010 in the device. Then, the device may include a feature that automatically opens or shears the cover. Alternatively or in addition, airflow from the device through the inlet opening 1018 causes the filter media 1016 to automatically expand and tear, push, and/or swing open the closure device, automatically expanding the filter 1010. In other embodiments, the closure device may be removed, such as by peeling or tearing, by the user before or immediately after installing the filter 1010.

Figure 26A:
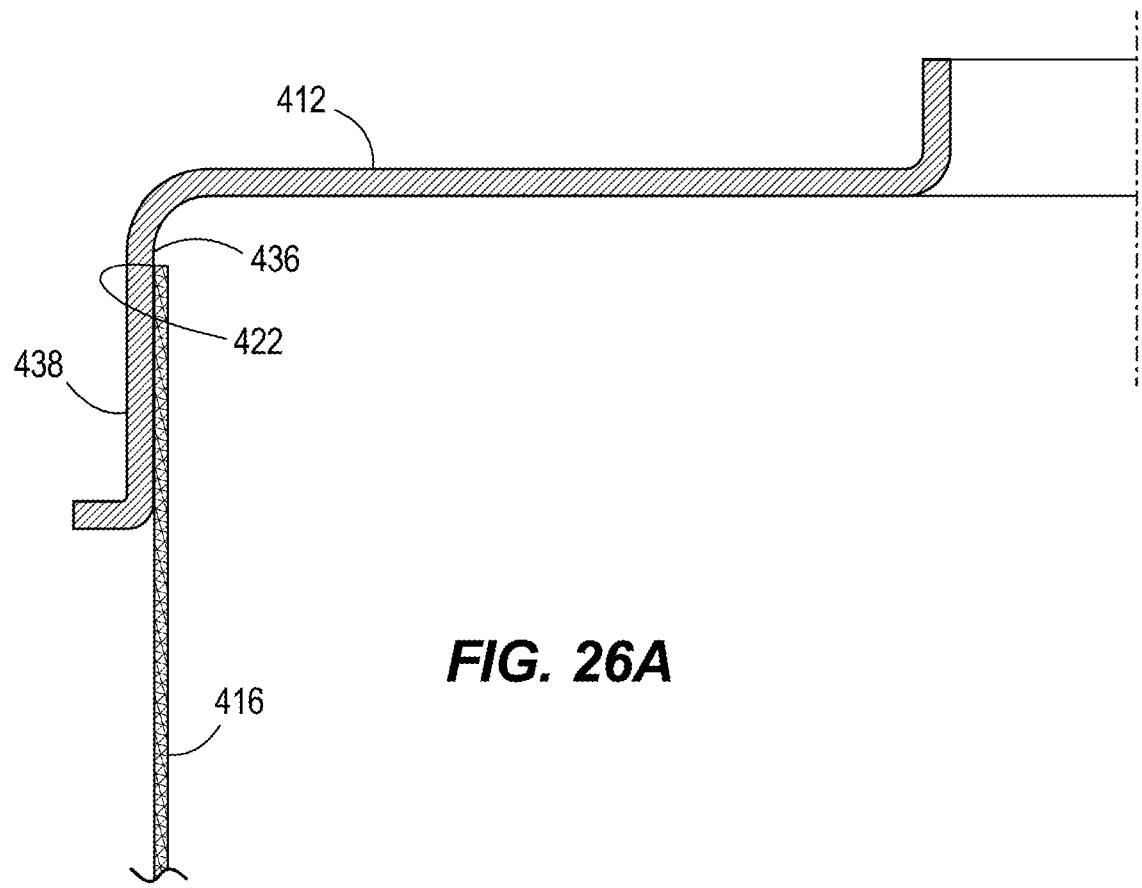
FIG. 26A is a cross-sectional view of a filter according to an embodiment.
Figure 26B:
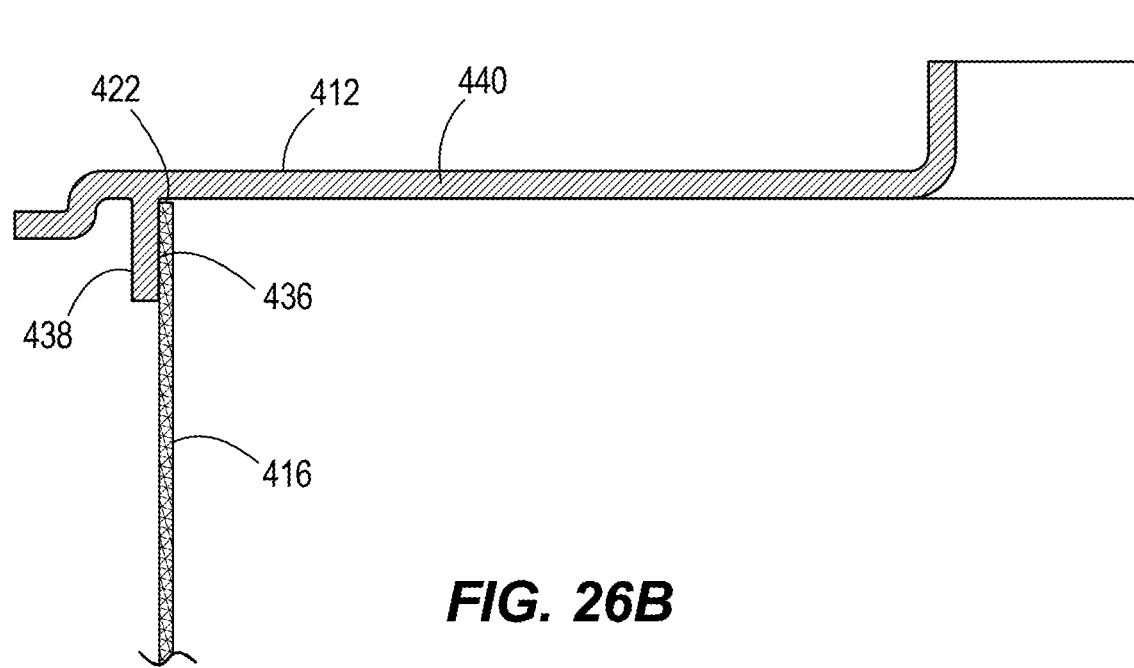
FIG. 26B is a cross-sectional view of a filter according to an embodiment.

FIG. 26A illustrates one possible way to attach the filter media 416 to the upper housing 412 (or any of the upper housings described herein). In the embodiment of FIG. 26A, the filter media 416 is welded onto an inside surface 436 of a sidewall 438 of the upper housing 412 at the first end 422 of the filter media 416. The media 416 can also be attached to the housing 412 using adhesive. In other embodiments, including when the upper housing 412 is formed from thermoplastic, the housing 412 may be overmolded onto the filter media 416. FIG. 26B illustrates the attachment described above with regard to FIG. 26A except that the housing 412 has a different shaped sidewall 438 and the end 422 of the filter media 416 abuts a top wall 440 of the housing 412. In the embodiments illustrated in FIGS. 26A and 26B, the attachment is generally radial or transverse to the direction of the filter media, with a mandrel, horn, or other attachment process support being provided through the lower end of the filter prior to the lower end being closed.

Figure 27B:
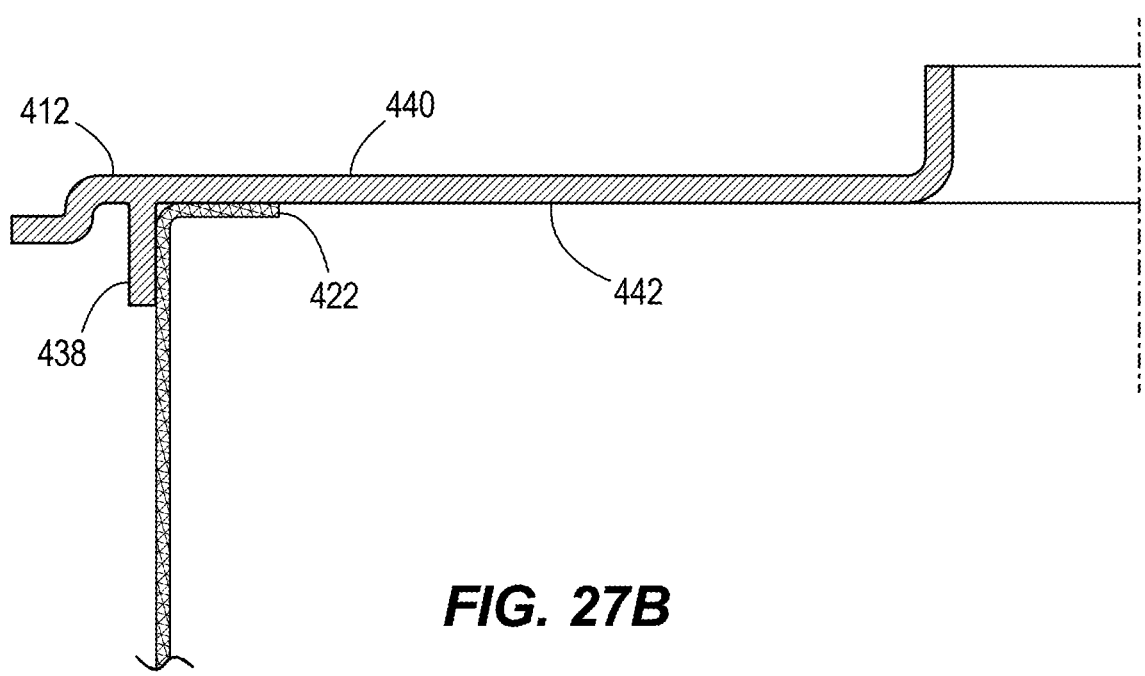
FIG. 27B is a cross-sectional view of a filter according to an embodiment.

FIG. 27A illustrates another possible way to attach the filter media 416 to the upper housing 412 (or any of the upper housings described herein). In the embodiment of FIG. 27A, the filter media 416 is welded onto an inside surface 442 of the top wall 440 of the upper housing 412 at the first end 422 of the filter media 416. Alternatively, the media 416 can be attached to the housing 412 using adhesive. In other embodiments, not shown, when the upper housing 412 is formed from thermoplastic, the housing 412 may be overmolded onto the filter media 416. FIG. 27B illustrates the attachment described above with regard to FIG. 27A except that the housing 412 has a different shaped sidewall 438. In the embodiments illustrated in FIGS. 27A and 27B, the attachment is generally axial or along the direction of the filter media, with a mandrel, horn, or other attachment process support being provided through the lower end of the filter prior to the lower end being closed.

Figure 28C:
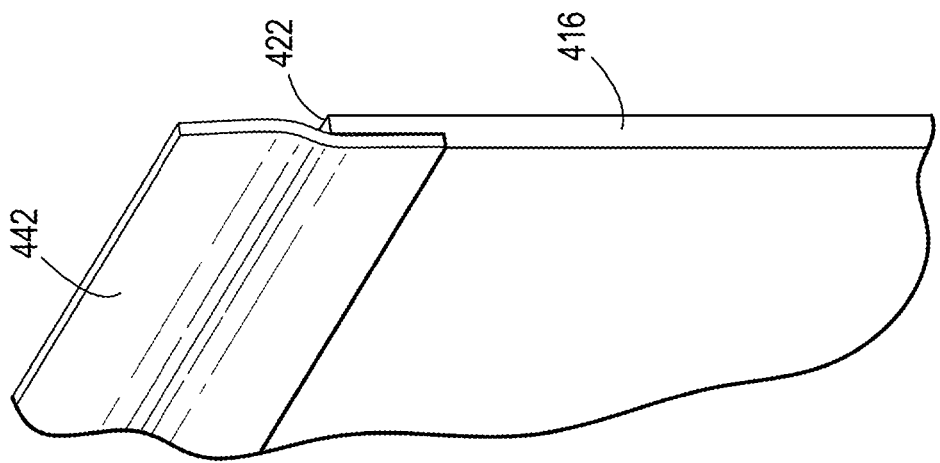
FIG. 28C is a perspective view of filter media for use in a filter.
Figure 28B:
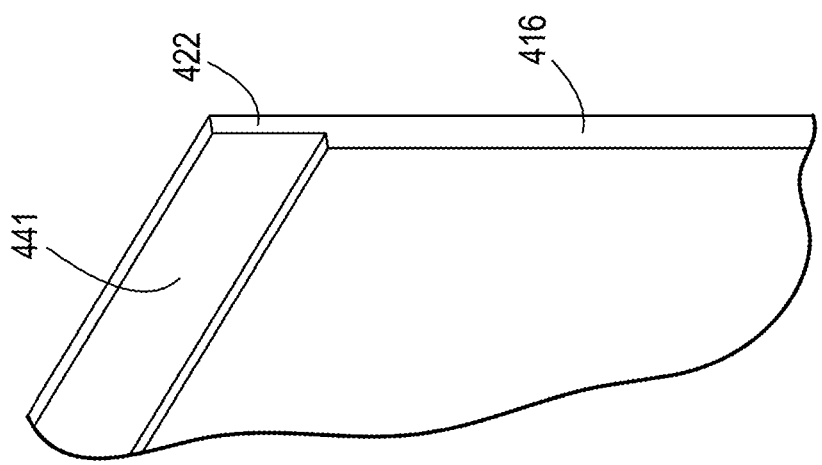
FIG. 28B is a perspective view of filter media for use in a filter.
Figure 28A:
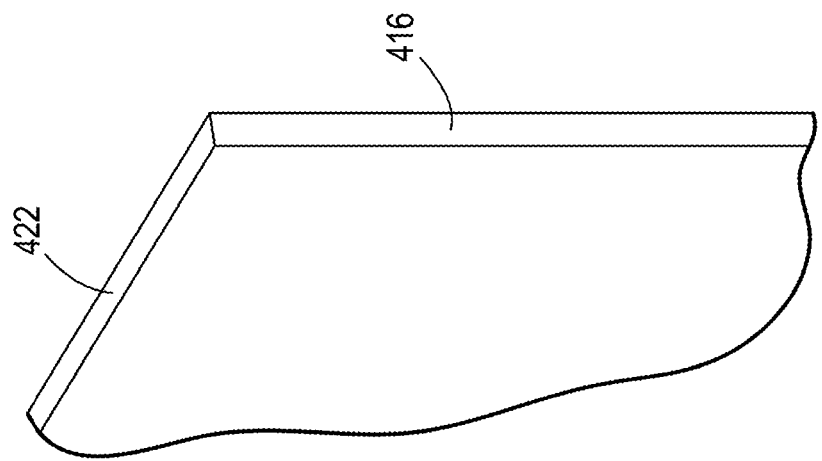
FIG. 28A is a perspective view of filter media for use in a filter.

FIGS. 28A-28C illustrate how the first end 422 of the filter media 416 may be prepared before attaching the filter media 416 to the housing 412 (similarly, how the second end of the filter media 416 could be prepared before attachment to the lower housing 414). FIG. 28A illustrates the first end 422 of the filter media 416 in its original thickness and the first end 422 can be attached to the housing 412 in its original thickness. Alternatively, as illustrated in FIG. 28B, the filter media 416 can be compressed along the first end 422 to create an area 441 of reduced thickness and increased density. The area 441 of reduced thickness is where the welding or overmolding to the housing 412 will be made. FIG. 28C illustrates another embodiment where a secondary strip of material 442 is welded other otherwise attached to the end 422 of the filter media 416. Then, the secondary strip of material 442 is welded, overmolded, or otherwise attached to the housing 412. In some embodiments, the secondary strip of material 442 includes a film and/or extrusion and can be applied to one or both sides of the filter media 416.

Figure 30:
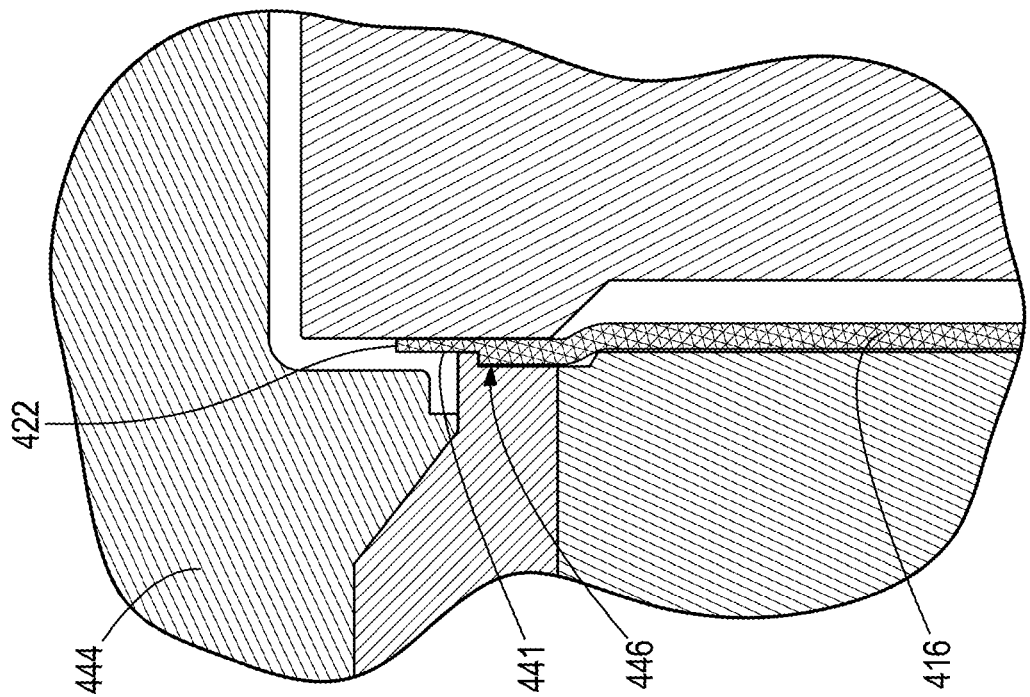
FIG. 30 is a cross-sectional view further illustrating the method of FIG. 29.
Figure 29:
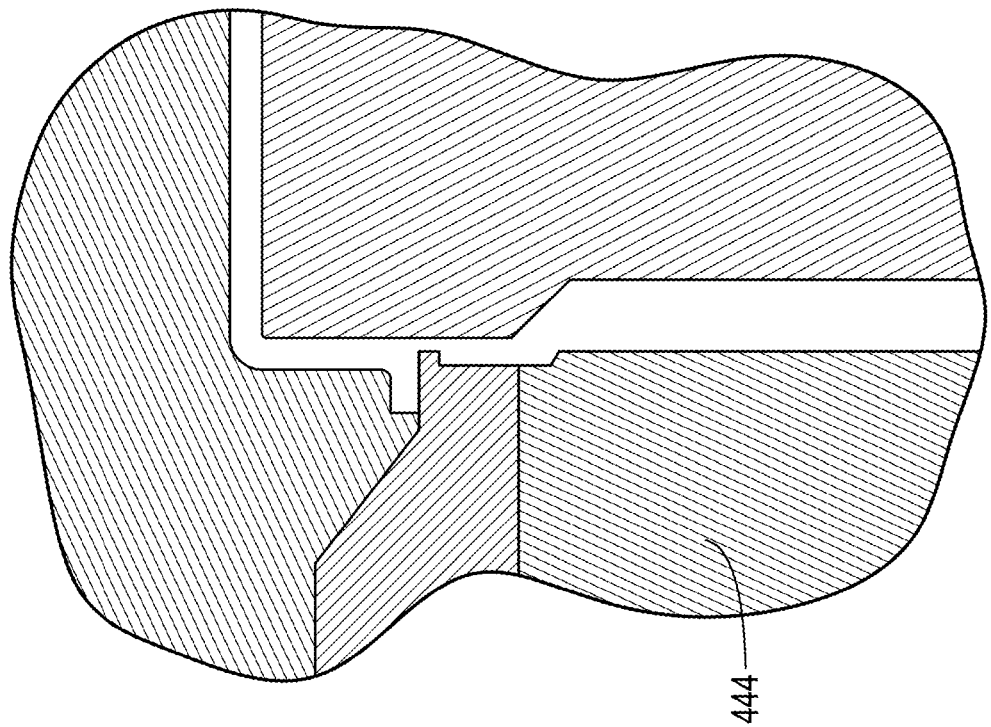
FIG. 29 is a cross-sectional view illustrating a method of manufacturing a filter.

FIGS. 29 and 30 illustrate one possible method of attaching the housings 412, 414 (or other housings discussed herein) onto the filter media 416 by overmolding. As shown in FIG. 30, the filter media 416 is placed into the mold 444 over the mold core being provided through the lower end of the filter prior to the lower end being closed. Then, the material of the housings 412, 414 is injected over the filter media 416. In the illustrated method of FIG. 30, the filter media 416 having the reduced thickness 441 at the end 422 is utilized. The mold 444 shuts off or closes against the media 416 at the area 441 of reduced thickness (near area of arrow 446 in FIG. 30). The injected material adheres to the filter media 416 along the area of reduced thickness 441 to attach the filter media 416 to the housings 412, 414. In various alternatives, filter media having end treatment shown in FIGS. 28A, 28B, and 28C may be utilized.

In another alternative, as discussed with reference to FIG. 18C, the filter media 416 may be divided into at least two portions, with the first portion of the filter media 416 being attached to the upper housing 412. Attaching a smaller portion of media to the upper may be useful in handing the filter media in a welding or molding process where internal support is needed. Then, after attachment of the first portion to the upper housing, the second piece of filter media 416' is attached to the first portion of filter media 416 using traditional bonding, sewing, or welding techniques. In one embodiment, not shown, the panel 428 is attached directly to the upper housing by welding, overmolding, adhesive, or other technique, and the filter media 416 is attached to the panel.

Figure 31A:
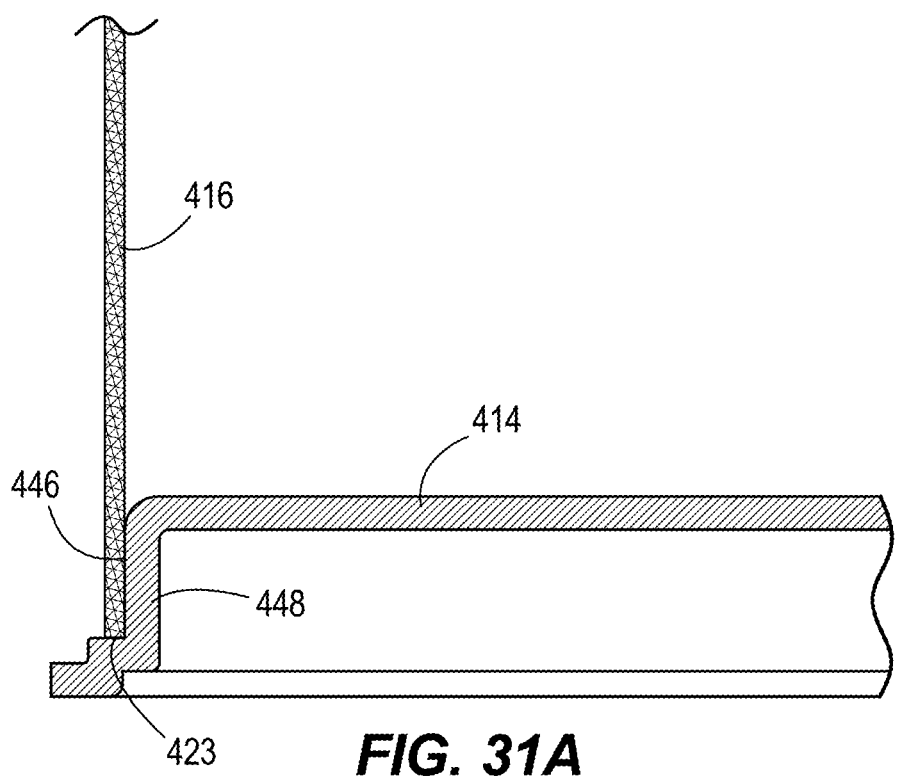
FIG. 31A is a cross-sectional view of a filter.
Figure 31B:
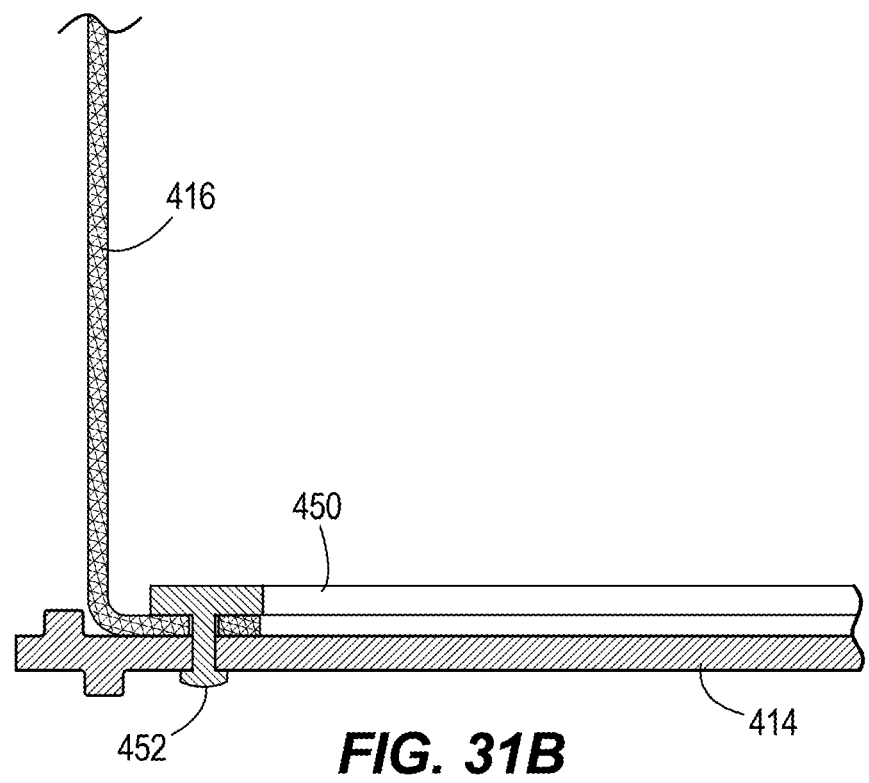
FIG. 31B is a cross-sectional view of a filter.

FIG. 31A illustrates a possible way to attach the filter media 416 to the lower housing 414 (or any of the lower housings described herein). In the embodiment of FIG. 31A, the filter media 416 is welded onto an outside surface 446 of a sidewall 448 of the lower housing 414 at the second end 423 of the filter media 416. The filter media 416 can also be attached to the housing 414 using adhesive. FIG. 31B illustrates one possible way to attach the filter media 316 to a flat lower housing 314 (similarly could be used to attach to a flat upper housing 412 or any of the housings described above). A ring 450 optionally having projections 452 may be fitted to capture the lower end of the filter media 416 between the ring and the housing 414 and may be heat staked or otherwise fastened to attach the filter media 416 and the housing 414.

Figure 32:
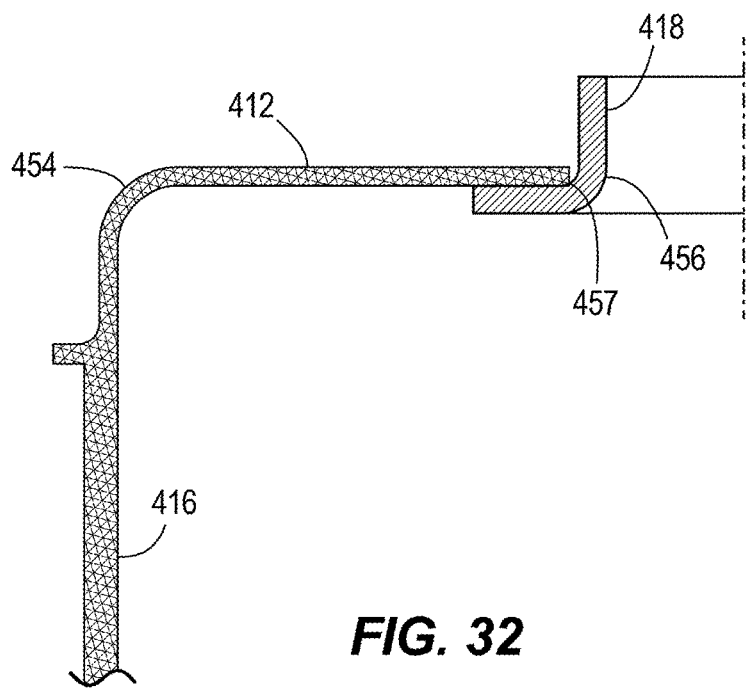
FIG. 32 is a cross-sectional view of a filter.

FIG. 32 illustrates an alternative embodiment where a portion 454 of the upper housing 412 is formed by the filter media 416, generally by making the filter media 416 in the portion 454 more rigid or stiffer than the other areas of the filter media 416. The portion 454 is stiffened by compression molding, vacuum thermoforming, or a combination of both, and/or coating/impregnating the portion 454 with thermoset, thermoplastic, or other material to make a rigid or semi rigid upper portion having a desired shape made with the filter media 416. An inlet piece 456, including the inlet opening 418, is inserted through an aperture 457 of the portion 454. The inlet piece 456 can be attached by welding or adhesive. In the illustrated embodiment, the inlet piece 456 is attached to the inside of the portion 454 and in other embodiments, the inlet piece 456 may be attached to the outside of the portion 454. In another embodiment, the inlet piece is overmolded onto the filter media before, during, or after the stiffening operation.

Figure 33:
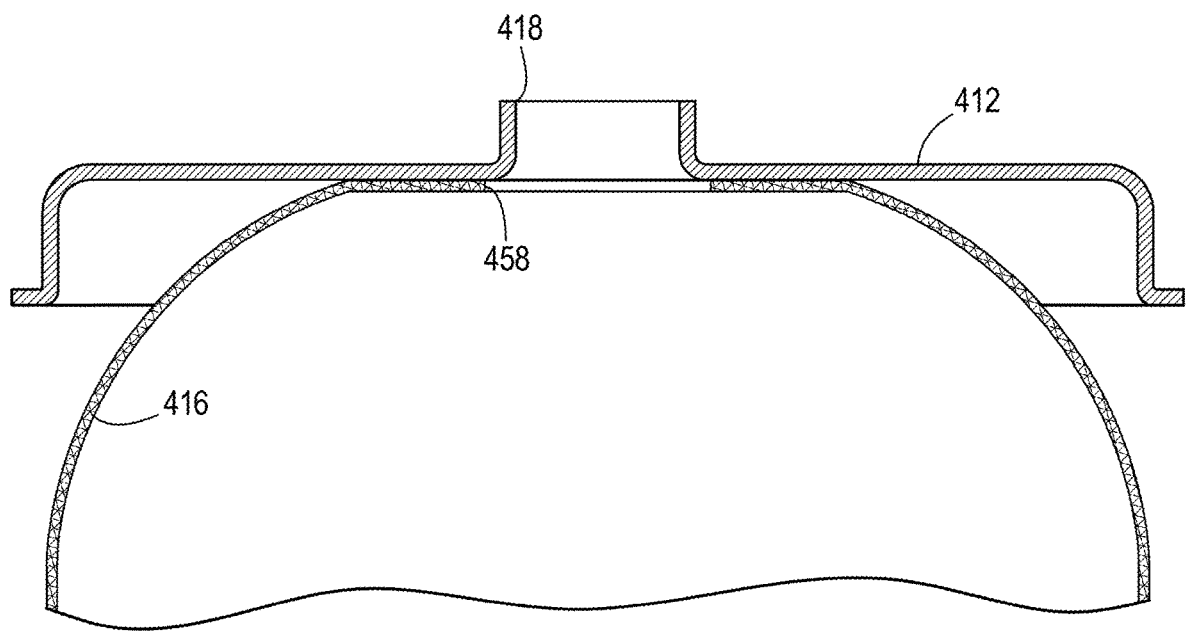
FIG. 33 is a cross-sectional view of a filter according to another embodiment.

FIG. 33 illustrates an alternative embodiment where the filter media 416 is formed with a generally closed end except for aperture 458. Then, the filter media 416 is attached to the housing 412 with the aperture 458 aligned with the inlet opening 418. The attachment could be made by welding or adhesive around the aperture 458.

Figure 34:
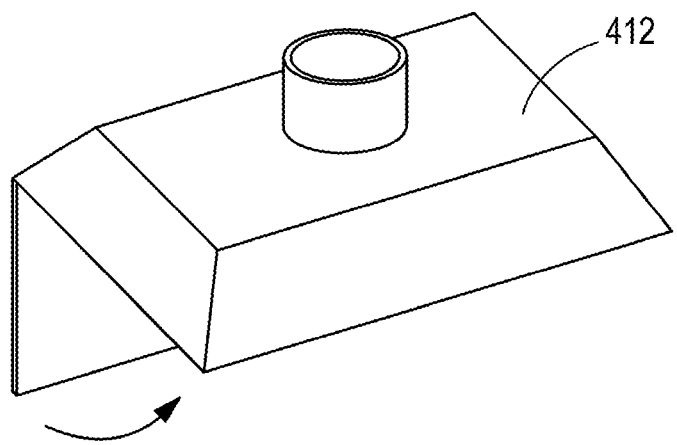
FIG. 34 is a perspective view of a housing for use in a filter.
Figure 35:
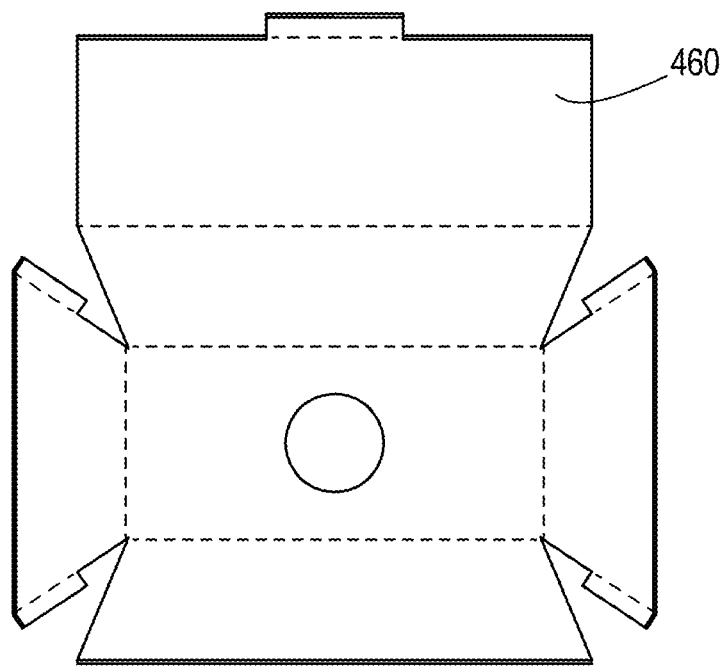
FIG. 35 is a bottom side view of the housing of FIG. 34 before the housing is formed into the position illustrated in FIG. 34.

FIGS. 34 and 35 illustrate an alternative embodiment where the housing 412 or housing 414 are formed by folding a die cut shape 460 (FIG. 35). The shape 460 is die cut and then folded to create the housing 412 or 414. The filter media can be attached to the housings 412 or 414 by welding or adhesive. In other embodiments, the housing can be formed from a single piece hinged from a top piece. The top and bottom die cut pieces could be separated and then bonded to each other or separately to the filter media by the methods previously discussed.

Figure 36:
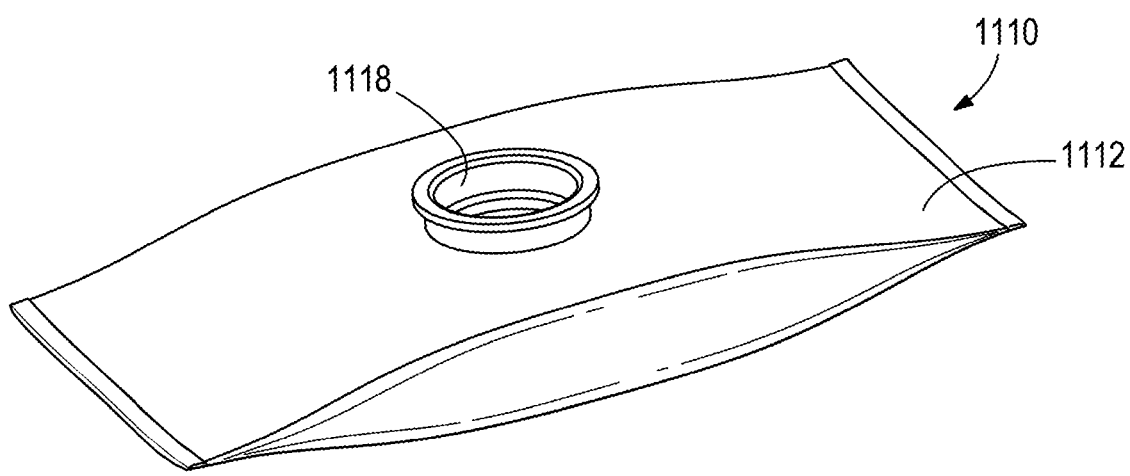
FIG. 36 is a perspective view of a filter according to an embodiment with the filter media in a collapsed position.
Figure 37:
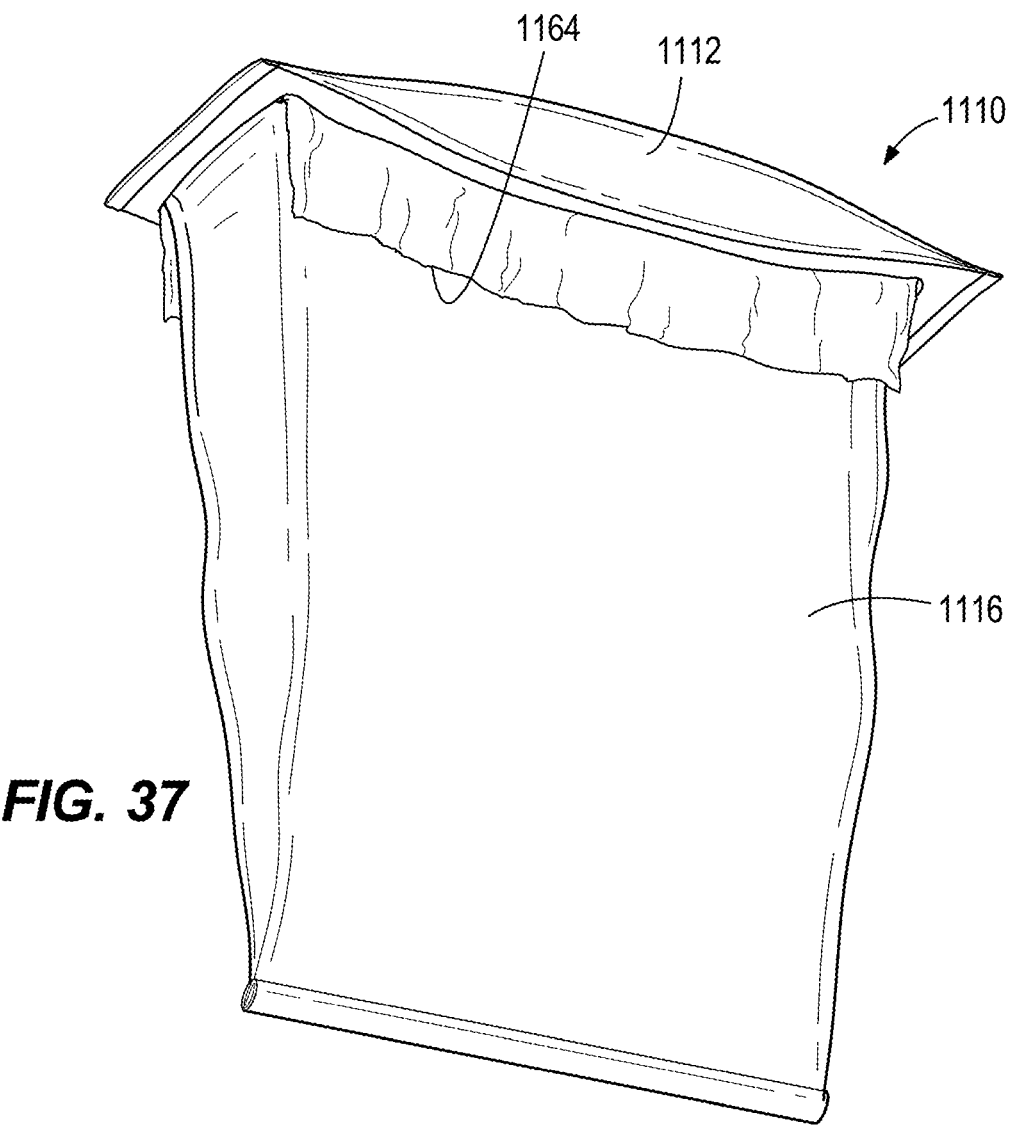
FIG. 37 is a perspective view of the filter of FIG. 36 illustrating the filter media in an expanded position.

FIGS. 36 and 37 illustrate a filter 1110 according to another embodiment. The filter 1110 includes features similar to the filters discussed above and only some differences between the filters will be discussed. The filter 1110 includes an upper housing 1112 that includes a bag 112. In one embodiment, filter media 1116 is formed as a complete enclosure with a desired inlet 1118. The filter media is compacted and inserted into an open end of the bag 1112 and then the bag sealed, or alternatively, the bag 1112 formed and sealed around the compacted media. Optionally, the bag 1112 is attached to the filter material around the inlet 1118. The bag 1112 can be formed from foil, plastic, paper, or other suitable materials. The bag 1112 includes a tear-out bottom 1164 opposite the inlet 1118 at the top of the bag 1112. In some applications, the bag 1112 is installed into the device with the filter media 1116 in the collapsed position (FIG. 36). Then, when the device is used or turned on, the filter media 1116 automatically breaks through the bottom 1164 of the bag 1112 because of the airflow through the inlet 1118. Alternatively, the bag includes a portion that the user opens before loading into a device, such as a tear-away portion, tear or cut line, or other opening. In yet another alternative, a mechanism may be used to push or pull one end of the filter away from the other moving the filter to the expanded position.

Although the invention has been described in detail with reference to certain preferred embodiments, variations and modifications exist within the scope and spirit of one of more independent aspects of the invention as described.

The invention claimed is:

1. A vacuum cleaner comprising:
a suction inlet;
a conduit in fluid communication with the suction inlet;
a filter including
a housing configured to be supported by the vacuum cleaner, the housing having an inner volume and a filter inlet,
a filter media coupled to the housing, the filter media and the housing at least partially define a chamber to collect debris, the filter media being movable between a collapsed position in which at least a portion of the filter media is encased within the inner volume of the housing and an expanded position in which the filter media extends away from the housing, and
a valve releasably connected to the filter inlet, the filter configured to collect debris drawn through the suction inlet; and
a release mechanism moveable from a first position to a second position, wherein in the first position, the filter is in fluid communication with the conduit to collect debris with the valve being open, and in the second position, the filter is disconnected from the conduit with the valve being closed,
wherein movement of the release mechanism between the first and second positions closes the valve.

2. The vacuum cleaner of claim 1, wherein movement of the release mechanism from the first position to the second position closes the valve and ejects the filter from the vacuum cleaner.

3. The vacuum cleaner of claim 2, wherein a user can eject the filter without touching the filter.

4. The vacuum cleaner of claim 1, wherein the conduit extends into the filter when the release mechanism is in the first position.

5. The vacuum cleaner of claim 1, wherein the release mechanism is operable such that a user can dispose of the filter without touching the filter.

6. The vacuum cleaner of claim 1, wherein the valve is coupled to the conduit for movement with the conduit to move the valve to the open and the closed positions.

7. The vacuum cleaner of claim 6, wherein the valve includes an engagement member to engage at least one of the housing and the filter inlet, and a receiver that couples the valve to the conduit.

8. The vacuum cleaner of claim 7, wherein the engagement member is provided on an outer periphery of the valve to engage the filter inlet, and the receiver is a pocket that receives and couples to the conduit.

9. The vacuum cleaner of claim 1, further comprising a seal between the valve and the filter inlet.

10. The vacuum cleaner of claim 9, where the seal is an o-ring.

11. The vacuum cleaner of claim 1, wherein the filter media moves out of the inner volume of the housing to an expanded position.

12. The vacuum cleaner of claim 11, wherein the vacuum cleaner further includes a body and the housing is supported by the body such that the filter media moves relative to the body and the housing as the filter media moves to the expanded position.

13. The vacuum cleaner of claim 1, wherein the inner volume of the housing is a first inner volume, wherein the filter media includes a first end, a second end, and a second inner volume between the first and second ends, the filter media coupled to the housing at the first end of the filter media such that the first and second inner volumes together at least partially define a collection container configured to store the debris separated by the filter media.

14. The vacuum cleaner of claim 13, wherein the housing is a first housing, the filter further comprising a second housing that defines a third inner volume, wherein the filter media is coupled to the second housing at the second end of the filter media, wherein the second housing and the first housing enclose the filter media when the filter media is collapsed into the first housing.

15. The vacuum cleaner of claim 14, wherein, the first inner volume of the filter media, along with the second inner volume of the first housing, and the third inner volume of the second housing together define the collection container.

16. The vacuum cleaner of claim 1, wherein the filter includes an attachment member that couples the filter media to the housing.

17. The vacuum cleaner of claim 16, wherein the housing includes a groove that receives the attachment member to couple the filter media to the housing.

18. The vacuum cleaner of claim 16, wherein the filter media is folded over the attachment member such that an end of the filter media extends away from the housing a desired length forming an overlapping filter media section.

19. The vacuum cleaner of claim 18, wherein a flow of fluid generated by the vacuum cleaner flows in a direction toward the overlapping filter media section.

20. The vacuum cleaner of claim 1, wherein the housing is formed from a plastic material.

21. A vacuum cleaner comprising:
a suction inlet;
a conduit in fluid communication with the suction inlet;
a filter including
    a housing having an inner volume and a filter inlet,
    a filter media collapsible into the inner volume of the housing, and
    a valve releasably connected to the filter inlet, the filter configured to collect debris drawn through the suction inlet; and
a release mechanism moveable from a first position to a second position, wherein in the first position, the filter is in fluid communication with the conduit to collect debris with the valve being open, and in the second position, the filter is disconnected from the conduit with the valve being closed,
wherein movement of the release mechanism between the first and second positions closes the valve, and
wherein movement of the release mechanism from the first position to the second position closes the valve and ejects the filter from the vacuum cleaner.

22. A vacuum cleaner comprising:
a suction inlet;
a conduit in fluid communication with the suction inlet;
a filter including
    a first housing having a first inner volume and a filter inlet,
    a filter media collapsible into the inner volume of the housing, the filter media having a first end, a second end, and a second inner volume between the first and second ends, the first end of the filter media being coupled to the first housing such that the first inner volume and the second inner volume together at least partially define a collection container configured to store debris separated by the filter medial, and
    a second housing that defines a third inner volume, the second end of the filter media being coupled to the second housing, the second housing and the first housing enclosing the filter media when the filter media is collapsed into the first housing,
    a valve releasably connected to the filter inlet, the filter configured to collect debris drawn through the suction inlet; and
a release mechanism moveable from a first position to a second position, wherein in the first position, the filter is in fluid communication with the conduit to collect debris with the valve being open, and in the second position, the filter is disconnected from the conduit with the valve being closed,
wherein movement of the release mechanism between the first and second positions closes the valve.

23. A vacuum cleaner comprising:
a suction inlet;
a body including a portion;
a conduit in fluid communication with the suction inlet;
a filter including
    a housing having an inner volume and a filter inlet,
    a filter media collapsible into the inner volume of the housing, and
    a valve releasably connected to the filter inlet, the filter configured to collect debris drawn through the suction inlet; and
a release mechanism movable between a first position relative to the portion and a second position relative to the portion,
wherein in the first position, the filter is connected to the conduit with the filter in fluid communication with the conduit to collect debris, the valve being open, and
wherein in the second position, the filter is disconnected from the conduit with the valve being closed
wherein movement of the release mechanism between the first and second positions closes the valve.

24. The vacuum cleaner of claim 23, further comprising a handle, the portion of the vacuum cleaner being the handle.

* * * * *